US012598615B2

(12) United States Patent
Khoshnevisan et al.

(10) Patent No.: US 12,598,615 B2
(45) Date of Patent: Apr. 7, 2026

(54) ENHANCING APERIODIC OR SEMI-PERIODIC CHANNEL STATE INFORMATION (CSI) MULTIPLEXING ON MULTIPLE PHYSICAL UPLINK SHARED CHANNEL (PUSCH) REPETITIONS

(71) Applicant: QUALCOMM Incorporated, San Diego, CA (US)

(72) Inventors: Mostafa Khoshnevisan, San Diego, CA (US); Yitao Chen, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 17/581,647

(22) Filed: Jan. 21, 2022

(65) Prior Publication Data

US 2023/0239879 A1     Jul. 27, 2023

(51) Int. Cl.
| | |
|---|---|
| *H04W 72/23* | (2023.01) |
| *H04B 7/06* | (2006.01) |
| *H04L 1/1607* | (2023.01) |
| *H04L 5/00* | (2006.01) |
| *H04W 72/21* | (2023.01) |

(52) U.S. Cl.
CPC .......... *H04W 72/23* (2023.01); *H04B 7/0626* (2013.01); *H04L 1/1671* (2013.01); *H04L 5/0048* (2013.01); *H04W 72/21* (2023.01)

(58) Field of Classification Search
CPC ... H04W 72/23; H04W 72/21; H04W 72/232; H04B 7/0626; H04B 7/0647; H04L 1/1671; H04L 1/08; H04L 5/0048; H04L 5/0012; H04L 5/0026; H04L 5/0073; H04L 5/001; H04L 5/0044; H04L 5/0057; H04L 5/0091
See application file for complete search history.

(56) References Cited

U.S. PATENT DOCUMENTS

| | | | |
|---|---|---|---|
| 2023/0035886 A1* | 2/2023 | Chen ..................... | H04L 5/0057 |
| 2023/0046727 A1* | 2/2023 | Jung ..................... | H04W 16/28 |
| 2023/0291451 A1* | 9/2023 | Su ............................. | H04L 1/08 |
| 2024/0015732 A1* | 1/2024 | Muruganathan ...... | H04L 5/0023 |

FOREIGN PATENT DOCUMENTS

KR     20220112154 A  * 10/2022   ........ H04W 72/1268

* cited by examiner

*Primary Examiner* — Jianye Wu
(74) *Attorney, Agent, or Firm* — Patterson & Sheridan LLP

(57) ABSTRACT

Certain aspects of the present disclosure provide techniques for multiplexing aperiodic channel state information (AP-CSI or A-CSI) or semi-periodic CSI (SP-CSI) on multiple physical uplink share channel (PUSCH) repetitions. For example, according to certain aspects, a method for wireless communications at a user equipment (UE) includes obtaining signaling indicating that the UE is to multiplex aperiodic channel state information (A-CSI) with the at least two PUSCH repetitions when one or more conditions are met, obtaining signaling scheduling the UE to transmit the at least two PUSCH repetitions, wherein the at least two PUSCH repetitions are associated with a first sounding reference signal (SRS) resource set, and outputting the at least two PUSCH repetitions for multiplexing with the A-CSI based on the signaling indication and the one or more conditions.

30 Claims, 14 Drawing Sheets

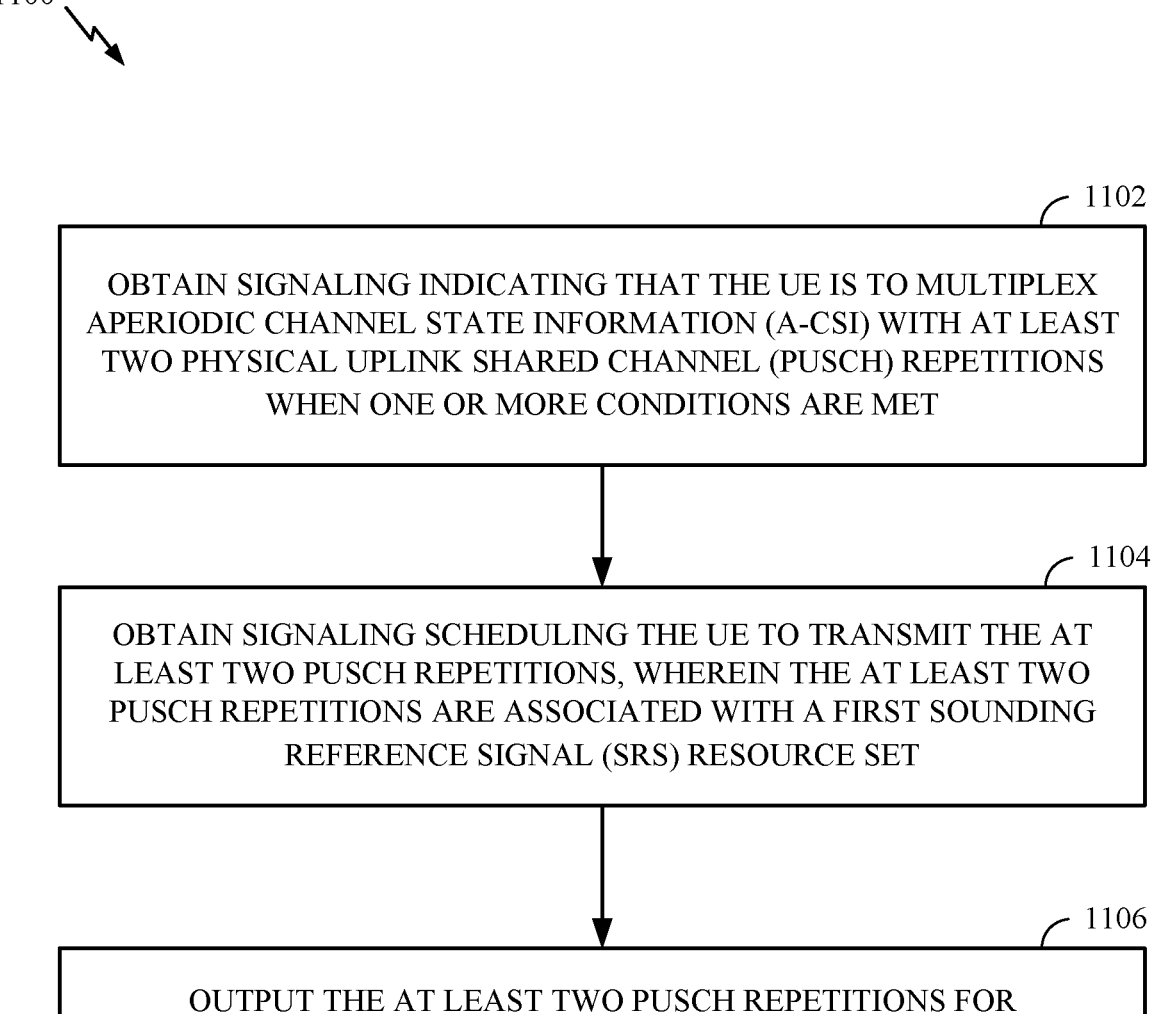

1100

1102

OBTAIN SIGNALING INDICATING THAT THE UE IS TO MULTIPLEX APERIODIC CHANNEL STATE INFORMATION (A-CSI) WITH AT LEAST TWO PHYSICAL UPLINK SHARED CHANNEL (PUSCH) REPETITIONS WHEN ONE OR MORE CONDITIONS ARE MET

1104

OBTAIN SIGNALING SCHEDULING THE UE TO TRANSMIT THE AT LEAST TWO PUSCH REPETITIONS, WHEREIN THE AT LEAST TWO PUSCH REPETITIONS ARE ASSOCIATED WITH A FIRST SOUNDING REFERENCE SIGNAL (SRS) RESOURCE SET

1106

OUTPUT THE AT LEAST TWO PUSCH REPETITIONS FOR MULTIPLEXING WITH THE A-CSI BASED ON THE SIGNALING INDICATION AND THE ONE OR MORE CONDITIONS

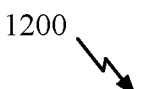

1202

OUTPUT, FOR TRANSMISSION TO A USER EQUIPMENT (UE), SIGNALING INDICATING THAT THE UE IS TO MULTIPLEX APERIODIC CHANNEL STATE INFORMATION (A-CSI) WITH AT LEAST TWO PHYSICAL UPLINK SHARED CHANNEL (PUSCH) REPETITIONS WHEN ONE OR MORE CONDITIONS ARE MET

1204

OUTPUT, FOR TRANSMISSION TO THE UE, SIGNALING SCHEDULING THE UE TO TRANSMIT THE AT LEAST TWO PUSCH REPETITIONS, WHEREIN THE AT LEAST TWO PUSCH REPETITIONS ARE ASSOCIATED WITH A FIRST SOUNDING REFERENCE SIGNAL (SRS) RESOURCE SET

1206

OBTAIN THE AT LEAST TWO PUSCH REPETITIONS WITH THE A-CSI MULTIPLEXED BASED ON THE SIGNALING INDICATION AND THE ONE OR MORE CONDITIONS

ENHANCING APERIODIC OR SEMI-PERIODIC CHANNEL STATE INFORMATION (CSI) MULTIPLEXING ON MULTIPLE PHYSICAL UPLINK SHARED CHANNEL (PUSCH) REPETITIONS

BACKGROUND

Field

Aspects of the present disclosure relate to wireless communications, and more particularly, to techniques for sending uplink transmissions with repetition.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These and other multiple access technologies have been adopted in various telecommunication standards to provide a common protocol that enables different wireless devices to communicate on a municipal, national, regional, and even global level. However, as the demand for mobile broadband access continues to increase, there exists a need for further improvements in these and emerging wireless communications technologies.

SUMMARY

Certain aspects of the present disclosure can be implemented in a method for wireless communications at a user equipment (UE). The method generally includes obtaining signaling indicating that the UE is to multiplex aperiodic channel state information (A-CSI) with at least two physical uplink shared channel (PUSCH) repetitions when one or more conditions are met, obtaining signaling scheduling the UE to transmit the at least two PUSCH repetitions, wherein the at least two PUSCH repetitions are associated with a first sounding reference signal (SRS) resource set, and outputting the at least two PUSCH repetitions for multiplexing with the A-CSI based on the signaling indication and the one or more conditions.

Certain aspects of the present disclosure can be implemented in a method for wireless communications at a network entity. The method generally includes outputting, for transmission to a user equipment (UE), signaling indicating that the UE is to multiplex aperiodic channel state information (A-CSI) with at least two physical uplink shared channel (PUSCH) repetitions when one or more conditions are met, outputting, for transmission to the UE, signaling scheduling the UE to transmit the at least two PUSCH repetitions, wherein the at least two PUSCH repetitions are associated with a first sounding reference signal (SRS) resource set, and obtaining the at least two PUSCH repetitions with the A-CSI multiplexed based on the signaling indication and the one or more conditions.

Certain aspects of the present disclosure can also be implemented in various apparatuses, means, and computer readable mediums capable of performing the operations described herein.

The following description and the appended drawings set forth in detail certain illustrative features of the one or more aspects. These features are indicative, however, of but a few of the various ways in which the principles of various aspects may be employed.

BRIEF DESCRIPTION OF THE FIGURES

The appended figures depict certain features of the various aspects described herein and are not to be considered limiting of the scope of this disclosure.

FIG. 11 illustrates example operations for wireless communication at a UE, in accordance with certain aspects of the present disclosure.

FIG. 12 illustrates example operations for wireless communication by network entity (e.g., a base station (BS)), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
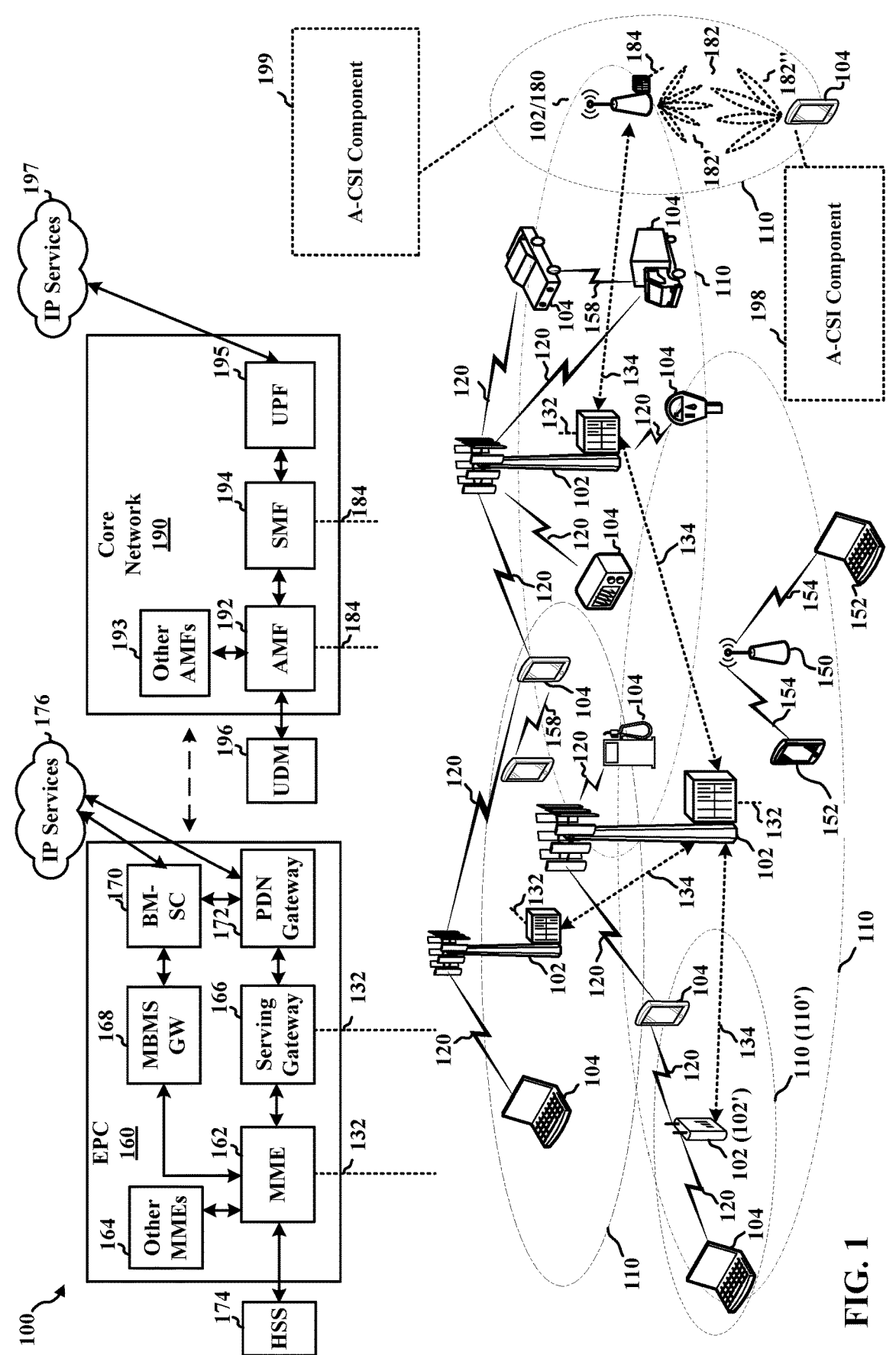
FIG. 1 is a block diagram conceptually illustrating an example wireless communication network, in accordance with certain aspects of the present disclosure.

Aspects of the present disclosure provide systems and methods for multiplexing aperiodic channel state information (AP-CSI or A-CSI) or semi-periodic CSI (SP-CSI) on physical uplink share channel (PUSCH) repetitions in single or multiple transmission-reception-point (sTRP or mTRP) situations. For example, the techniques presented herein may be used as an alternative to, or in addition to, existing multiplexing rules for indicating and selecting eligible PUSCH repetitions for multiplexing A-CSI. The techniques may be applicable when different sounding reference signal (SRS) resource sets of sTRP or mTRP are involved, because not all PUSCH repetitions are eligible for multiplexing A-CSI. Although this disclosure uses A-CSI as the primary example for discussing the relevant techniques, the similar or same techniques may be equally applicable to SP-CSI situations (not separately enumerated for conciseness reasons).

Downlink control information (DCI) may request A-CSI report when the DCI schedules multiple PUSCH repetitions. Under existing rules (e.g., Release 15 and 16), the CSI report may be multiplexed only on the first PUSCH repetition (the first actual PUSCH repetition for Type B repetitions). When two sets of PUSCH repetitions are associated with two SRS resource sets, A-CSI may be multiplexed on two PUSCH repetitions (one associated with each resource set) when certain conditions are satisfied (e.g., conditions of Release 17, including the two PUSCH repetitions having the same length and UCIs other than A-CSI are not multiplexed). However, existing schemes may fail to support cases when A-CSI is to be multiplexed on multiple PUSCHs repetitions that are associated with a single SRS resource set, or when A-CSI is to be multiplexed on more than two PUSCH repetitions associated with multiple SRS resource sets (current schemes support only two).

Aspects of the present disclosure, however, may help address such cases. For example, a user equipment (UE) may receive signaling that schedules the UE to transmit at least two PUSCH repetitions. The at least two PUSCH repetitions are associated with a first sounding reference signal (SRS) resource set. The UE may then receive signaling that indicates that the UE is to multiplex A-CSI with the at least two PUSCH repetitions when one or more conditions are met. The UE transmits the at least two PUSCH repetitions with the A-CSI multiplexed based on the signaling indication and the one or more conditions. The one or more conditions may be related to existing A-CSI multiplexing rules, such as uplink control information (UCI) other than A-CSI may not be multiplexed on the PUSCH repetitions multiplexed with A-CSI.

The present disclosure provides methods and techniques for indicating how to multiplex A-CSI on multiple PUSCH repetitions in these unsupported scenarios and for determining eligible PUSCH repetitions to maximize the number of PUSCH repetitions on which A-CSI is multiplexed for improving efficiency.

Brief Introduction to Wireless Communication Networks

FIG. 1 depicts an example of a wireless communications system 100, in which aspects described herein may be implemented. While FIG. 1 is briefly introduced here for context, additional aspects of FIG. 1 are described below.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may generally provide an access point to the EPC 160 and/or core network 190 for a UE 104, and may generally perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions, including those further described herein. Base stations described herein may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may generally provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device (e.g., a smart watch, smart ring, smart bracelet, etc.), a vehicle, an electric meter, a gas pump, a large or small kitchen appliance, a healthcare device, an implant, a sensor/actuator, a display, or any other similar functioning device. Some of UEs 104 may be internet of things (IoT) devices (e.g., parking meter, gas pump, toaster, vehicles, heart monitor, etc.), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

In some cases, a base station 102 in the wireless communication network 100 may include an A-CSI component 199, which may be configured to perform the operations shown in FIG. 12, as well as other operations described herein for multiplexing A-CSI on multiple PUSCH repetitions. Additionally, a UE 104 in the wireless communication network 100 may include an A-CSI component 198, which may be configured to perform the operations depicted and described with respect to FIG. 11, as well as other operations described herein for multiplexing A-CSI on multiple PUSCH repetitions.

Figure 2:
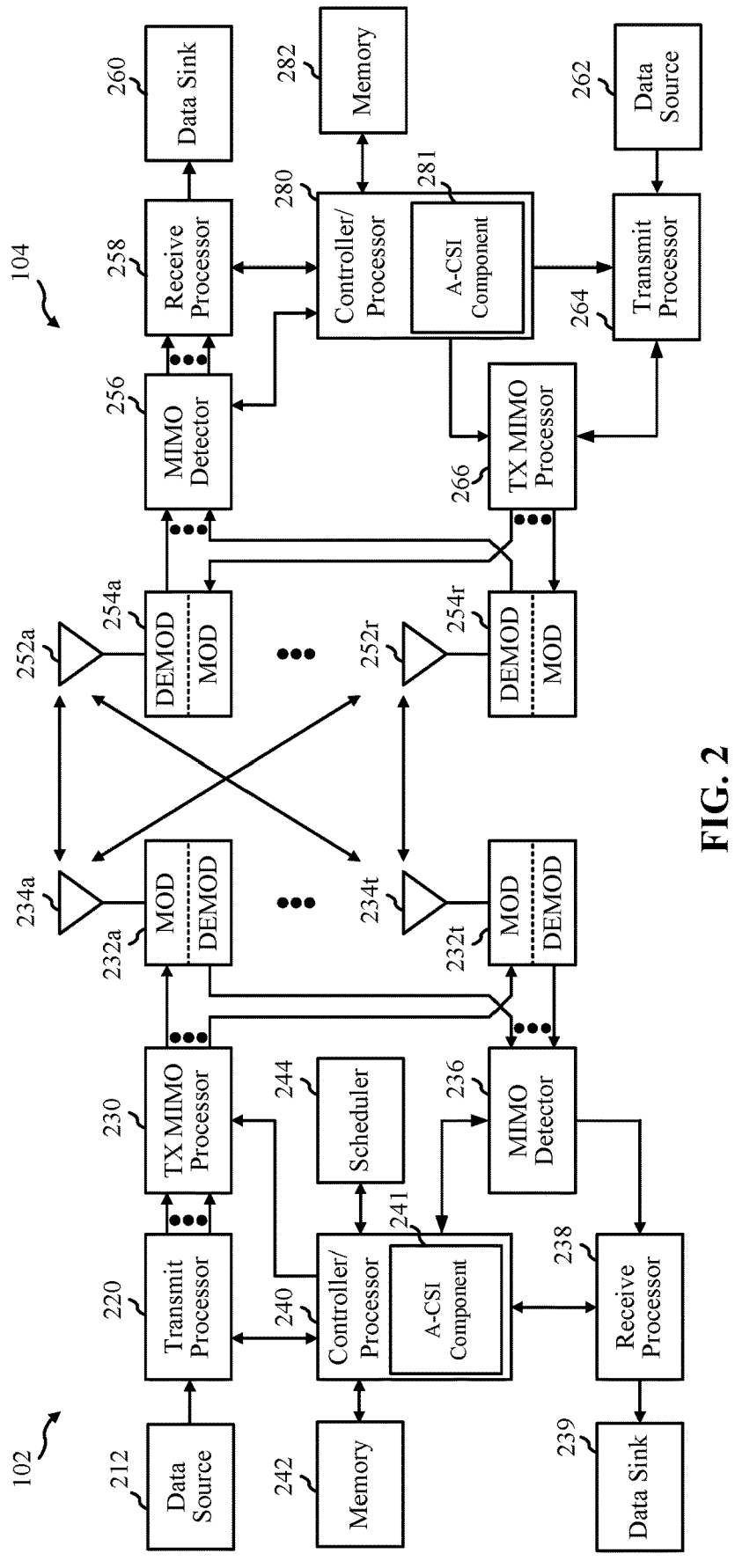
FIG. 2 is a block diagram conceptually illustrating aspects of an example a base station (BS) and user equipment (UE), in accordance with certain aspects of the present disclosure.

FIG. 2 depicts certain example aspects of a base station (BS) 102 and a user equipment (UE) 104. As with FIG. 1, FIG. 2 is briefly introduced here for context and additional aspects of FIG. 2 are described below.

Generally, BS 102 includes various processors (e.g., 220, 230, 238, and 240), antennas 234*a-t*, transceivers 232*a-t*, and other aspects, in order to transmit data (e.g., source data 212) and to receive data (e.g., data sink 239). For example, BS 102 may send and receive data between itself and UE 104.

In the depicted example, BS 102 includes controller/processor 240, which comprises an A-CSI component 241. In some cases, the A-CSI component 241 may be configured to implement A-CSI component 199 of FIG. 1 and to perform the operations depicted and described with respect to FIG. 9.

UE 104 generally includes various processors (e.g., 258, 264, 266, and 280), antennas 252*a-r*, transceivers 254*a-r*, and other aspects, in order to transmit data (e.g., source data 262) and to receive data (e.g., data sink 260).

In the depicted example, UE 104 includes controller/processor 280, which comprises an A-CSI component 281. In some cases, the A-CSI component 281 may be configured to implement the A-CSI component 198 of FIG. 1 and to perform the operations depicted and described with respect to FIG. 8.

Figures 3A, 3B, 3C, 3D:
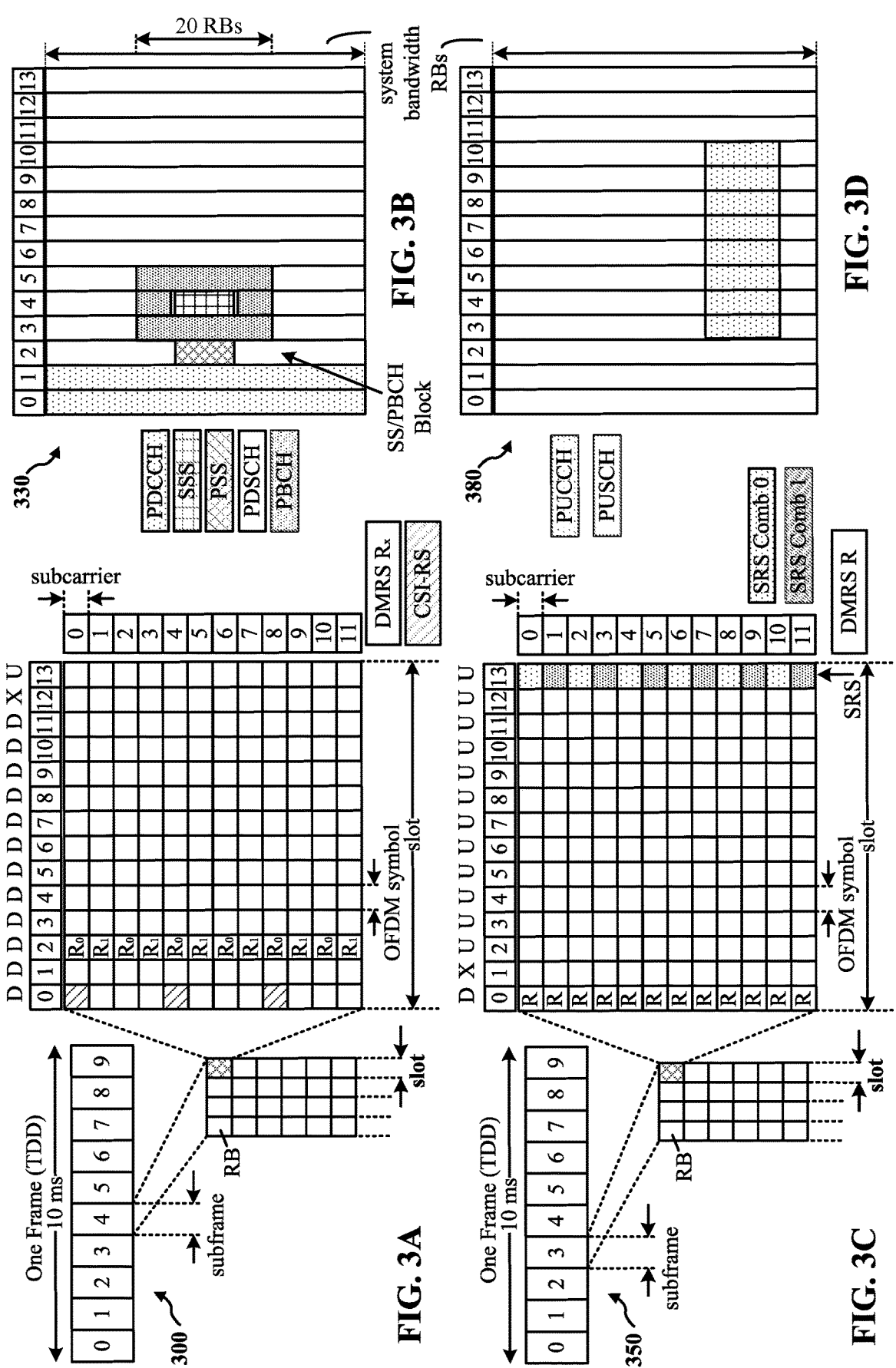
FIGS. 3A-3D depict various example aspects of data structures for a wireless communication network.

FIGS. 3A-3D depict various example aspects of data structures for a wireless communication network, such as wireless communication network 100 of FIG. 1. In particular, FIG. 3A is a diagram 300 illustrating an example of a first subframe within a 5G (e.g., 5G NR) frame structure. FIG. 3B is a diagram 330 illustrating an example of DL channels within a 5G subframe. FIG. 3C is a diagram 350 illustrating an example of a second subframe within a 5G frame structure. FIG. 3D is a diagram 380 illustrating an example of UL channels within a 5G subframe.

Brief Introduction to mmWave Wireless Communications

The electromagnetic spectrum is often subdivided, based on frequency/wavelength, into various classes, bands, channels, etc. In various aspects, a frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmW/near mmW radio frequency band (e.g., 3 GHz-300 GHz) may have higher path loss and a shorter range compared to lower frequency communications. Accordingly, in FIG. 1, mmW base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Overview of Uplink Repetitions

As noted above, in 5G New Radio (NR) networks, different types of uplink (UL) repetition mechanisms are defined (referred to as type A and type B) for physical UL shared channel (PUSCH) and/or a physical UL control channel (PUCCH) transmissions. Repetition may increase the likelihood of successful reception, for example, allowing for increased coding gain and soft combining at the network side (of multiple samples received in different time periods).

Figure 4A:
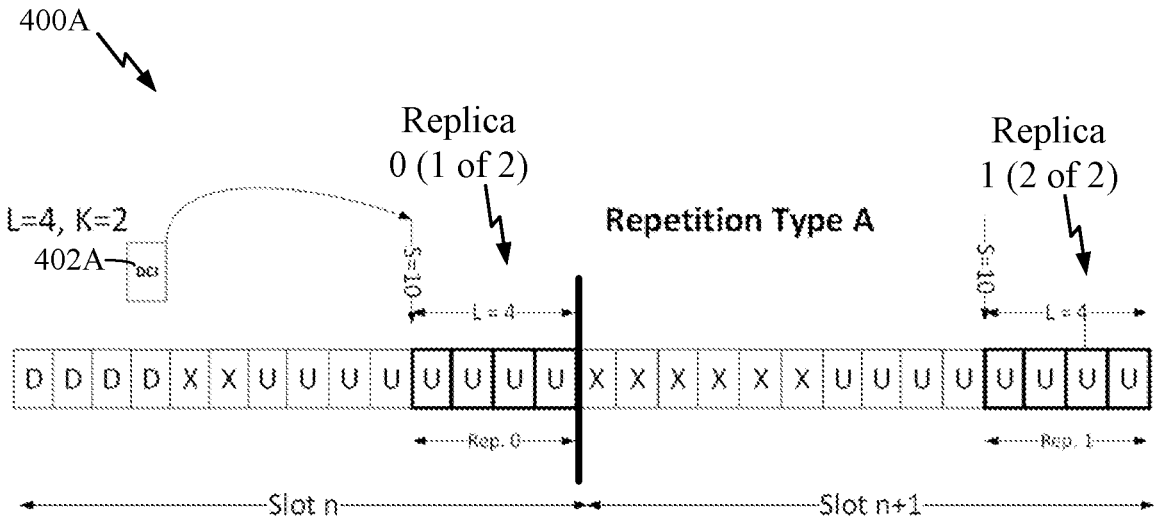
FIGS. 4A-4B are example timelines illustrating different uplink repetition types, respectively.

As illustrated in the timeline 400A of FIG. 4A, which illustrates an example scenario of repetition type A, a repetition pattern may be based on information (number K, length L, and starting symbol S) contained in a Start Length Information Value (SLIV) indicated via a DCI.

In the case of Type A, one PUSCH is transmitted in each slot and the time domain resource allocation (TDRA) is the same in each slot. Thus, as illustrated in FIG. 4A, repetitions repeat across slots, occupying the same resources in each slot. In the illustrated example, the repetition parameters (S, L, and K) may be configured in downlink control information (DCI) 402A conveying a SLIV. In the illustrated example, there are two repetitions (K=2) with a 4 symbol length (L=4). A first UL repetition 0 occurs in slot n, starting at a $10^{th}$ symbol (e.g., S=10), while the second repetition 1 occurs in slot n+1.

In other words, in Type A, different repetitions are transmitted in different slots. In each slot, the same symbols (e.g., symbols having the same starting symbol and same length) may be used for the PUSCH repetitions. The number of repetitions K may either be semi-statically configured in radio resource control (RRC) messages, or dynamically indicated by the DCI 402A (e.g., indicated in the TDRA field therein). When configured by RRC, the UE may be configured with the parameter pusch-Aggregation actor, whose value is used for the number of repetitions K. When dynamically indicated by DCI, the number of repetitions K is equal to numberofrepetitions indicated by the DCI (corresponding to a TDRA row).

Figure 4B:
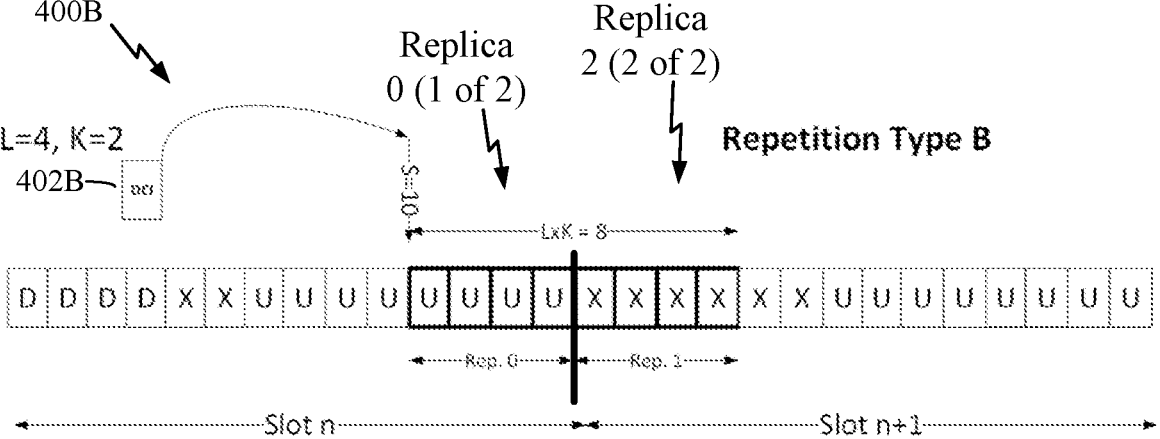

As illustrated in the timeline 400B of FIG. 4B, type B repetitions may be sent back-to-back within and/or across slots in accordance with the information in the configured SLIV (which may be a new format) conveyed the DCI 402B. For type B repetition, a TDRA field in the DCI may indicate the resource for a first "nominal" repetition. The time domain resources for the remaining repetitions may be derived based at least on the resources for the first repetition and UL/DL direction of symbols. The SLIV in the DCI indicates a "nominal" number of repetitions, which are consecutive. The repetitions and number of repetitions are referred to as nominal because the scheduled repetitions may be considered theoretical in comparison to what is actually achievable (actual repetitions) based on actual uplink/downlink (UL/DL) direction of symbols in the relevant slot(s).

As shown, the nominal repetition may be consecutive (e.g., Replica 0 and Replica 2). The nominal repetitions may have the same length. When a nominal repetition crosses the slot boundary, the repetition may be divided into two actual repetitions (e.g., Rep. 0 and Rep. 1).

Further, in the illustrated example, the configured starting symbol of 10 (S=10), number of repetitions (K=2), and length of each repetition (L=4) results in the first repetition (Rep. 0) occupying the last 4 symbols in slot n and the second repetition (Rep. 1) occupying the first four symbols of slot n+1). Thus, as illustrated, the repetitions cross the slot boundary. Type B repetition may provide enhanced flexibility, for example, allowing for a dynamic indication of a number of repetitions, inter-nominal PUSCH frequency hopping, and new UL/downlink (DL) symbol interaction (e.g., opportunistically allowing flexible symbols to be used for uplink repetition).

Figure 6:
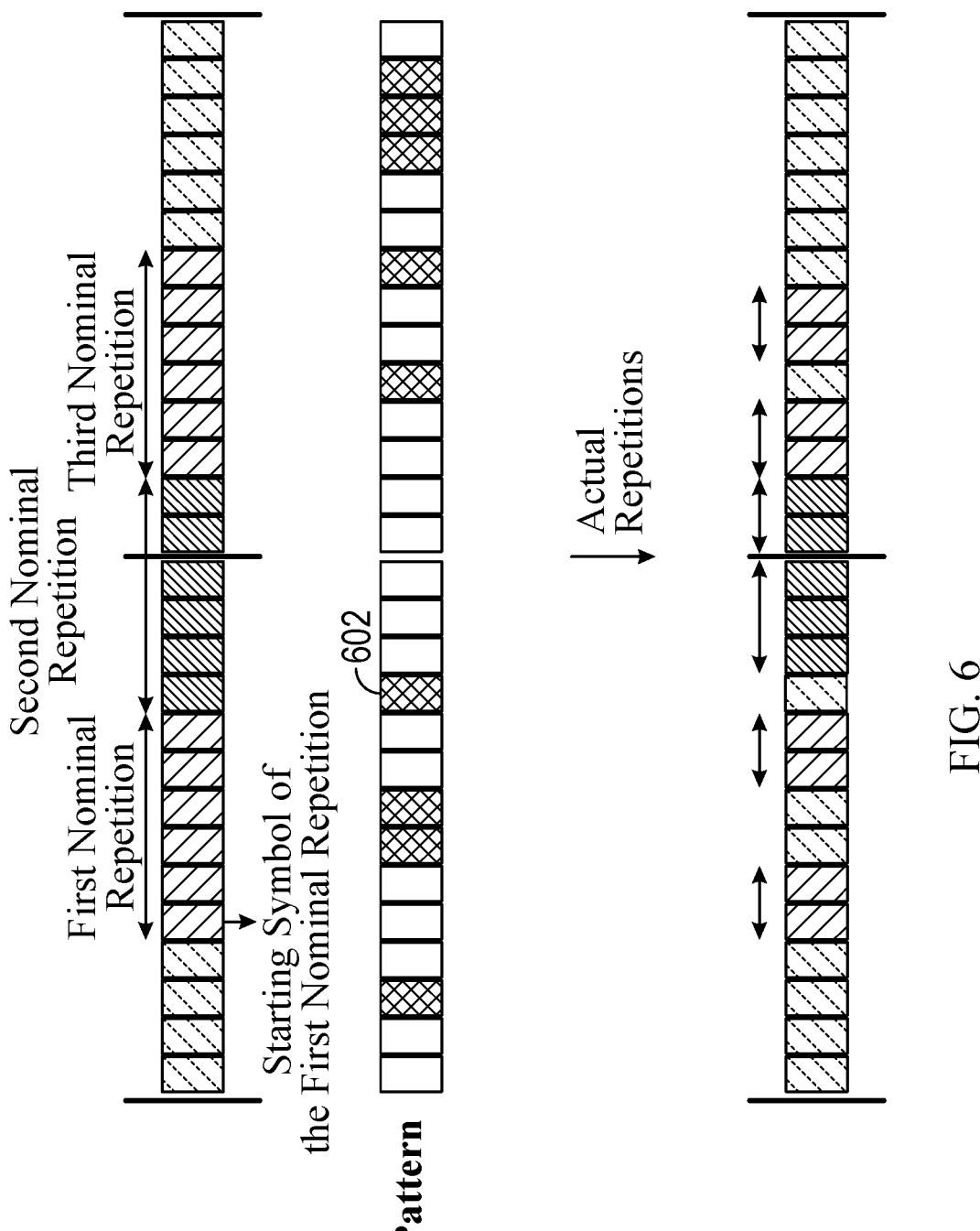
FIG. 6 illustrates an example application of an invalid symbol pattern to a PUSCH repetition.

Similar to Type A, in Type B, the number of nominal repetitions may be indicated by the value of numberofrepetitions configured per row of the TDRA table (e.g., the DCI indicates a row of the TDRA table). When some of the symbols of a nominal repetition are identified as invalid symbols, a nominal repetition is divided into multiple actual repetitions after removing the invalid symbols. The invalid symbols may be invalid because they are semi-static DL symbols, they are indicated symbol in a pattern of invalid symbols (e.g., as shown in FIG. 6), or they are SSB symbol or symbols where CORESET0 for Type0-PDCCH is monitored, among other reasons.

Figure 5:
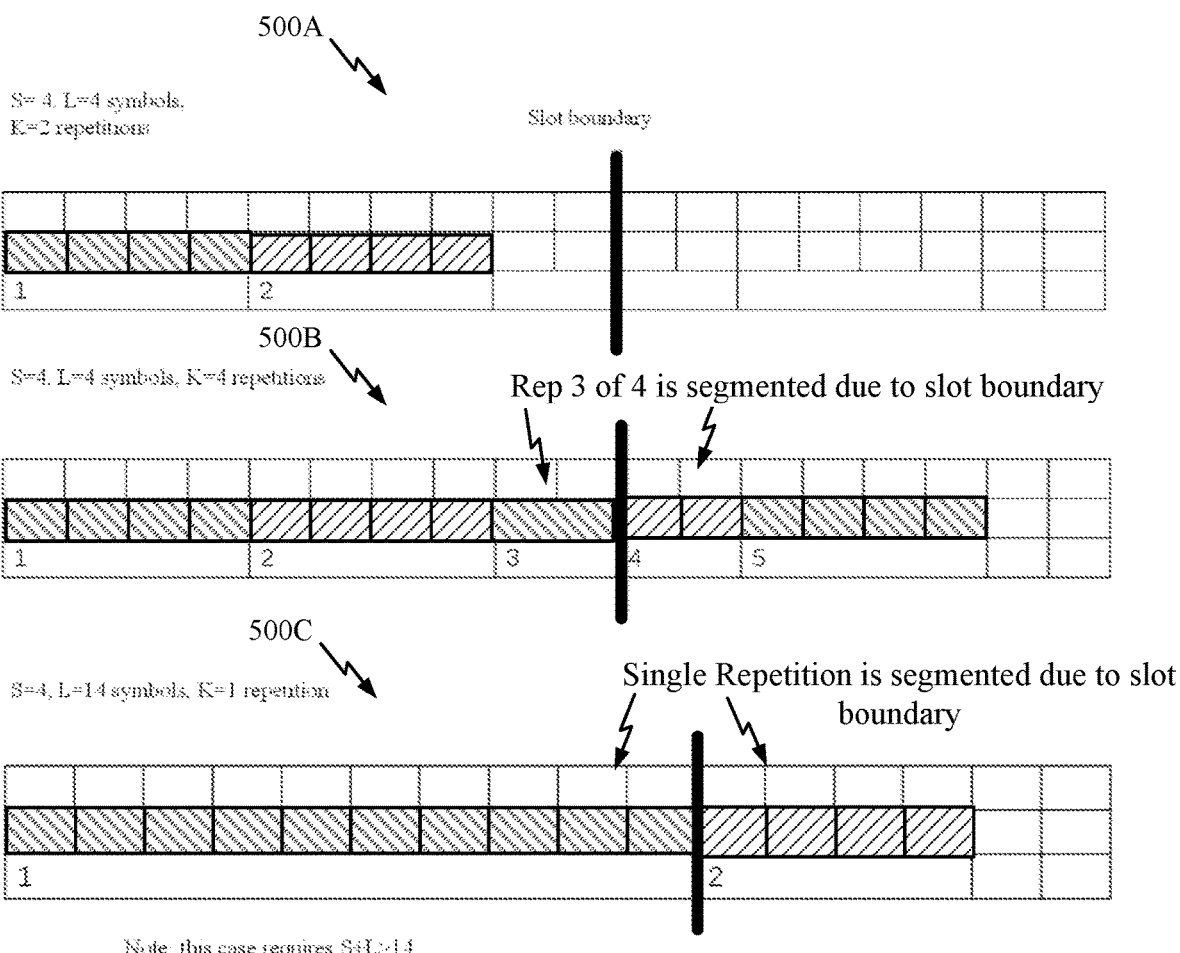
FIG. 5 illustrates example timelines of different scenarios of uplink repetitions.

FIG. 5 illustrates additional example timelines of type B slot repetitions. As shown in the first timeline 500A, with a starting symbol of 4 (S=4), 2 repetitions (K=2) of length 4 (L=4), both repetitions may be contained in the same slot (the repetitions do not cross the slot boundary).

As illustrated in timeline 500B, if the number of repetitions is increased to 4 (K=4), the third repetition of length 4 would cross the slot boundary. In such cases, this nominal repetition may be segmented, as shown, into two smaller actual repetitions of length 2. Similarly, as illustrated in timeline 500C, even if the number of repetitions is only 1 (K=1) but the length is increased to 14 (L=14), the single repetition of length 14 would cross the slot boundary. In such cases, this nominal repetition may be segmented, as shown, into two smaller actual repetitions of lengths 10 and 4.

Segmentation may also occur due to the occurrence of semi-static DL symbols, and/or in response to a parameter InvalidSymbolPattern (indicating the occurrence of a symbol not valid for a nominal uplink repetition). For example, an invalid symbol pattern (or referred to generally as a pattern) identifies unavailable or invalid symbols in a PUSCH with repetition. For example, when some of the symbols of a nominal repetition are identified as invalid symbols, a nominal repetition is divided into multiple actual repetitions after removing the invalid symbols. Invalid symbols can be produced or generated based on: one or more indicated symbols in a pattern (e.g., by definition or indication); semi-static downlink symbols; synchronization signal block (SSB) symbol(s), or where CORESET0 (for Type0-PDCCH) is monitored. If an actual repetition after segmentation has only one symbol, the one symbol may be omitted.

FIG. 6 illustrates an example application of an invalid symbol pattern to a PUSCH repetition. The invalid symbol pattern may be configured by the UE with a higher layer parameter (e.g., InvalidSymbolPattern or invalidSymbolPattern). For example, the pattern provides a symbol level bitmap spanning one or two slots: Bitmap of length 14 (one slot) or 28 (2 slots). A two-slot pattern is shown in FIG. 6. In some cases, a bit value equal to 1 in the symbol level bitmap symbols indicates that the corresponding symbol is an invalid symbol 602 for PUSCH repetition (e.g., Type B transmission).

Example CSI Report on PUSCH

Figure 7:
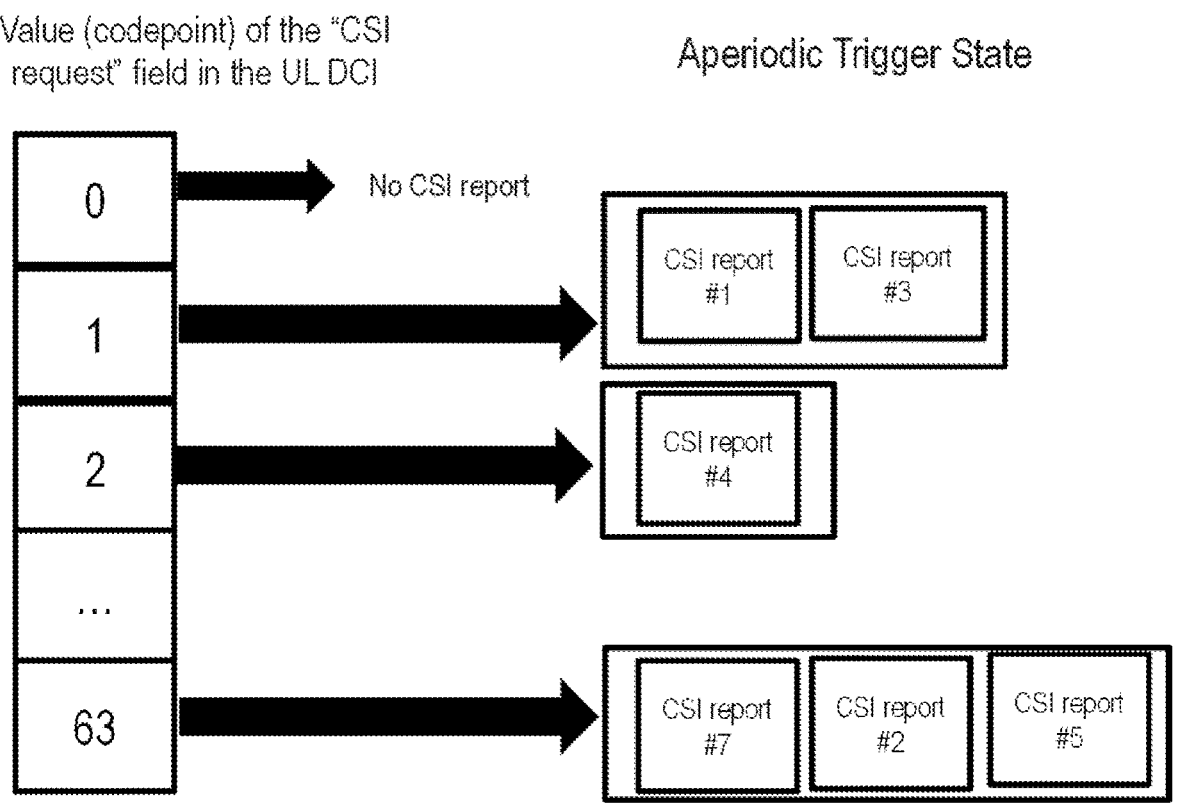
FIG. 7 illustrates an example of triggering channel state information (CSI) report on physical uplink share channel (PUSCH) and corresponding aperiodic trigger states.

FIG. 7 illustrates an example of triggering channel state information (CSI) report on physical uplink share channel (PUSCH) and corresponding aperiodic trigger states. In general, a downlink control information (DCI) scheduling an uplink transmission (referred to as an UL DCI) may trigger a CSI report on PUSCH, such as an aperiodic CSI (A-CSI) report on PUSCH. Up to 128 trigger states may be configured via radio resource control (RRC) signaling (e.g., by a higher layer parameter, such as AperiodicTriggerStateList). Each trigger state on the list may be linked to one or more (up to a maximum number of 16) CSI report settings.

As shown in FIG. 7, a value (or codepoint) of the "CSI request" field in the UL DCI may trigger a CSI report according to aperiodic trigger states. For example, if a value in the "CSI request" field indicates N bits, then a maximum number of $2^N-1$ trigger states may be activated through MAC-CE (e.g., by mapping to the maximum of 63 codepoints for N=6 (all 0's means no CSI report triggered)). The CSI request field of the UL DCI may indicate one trigger state, which triggers one or more CSI reports (linked to the indicated trigger state).

In some cases (e.g., according to specifications in Release 15 or 16), when A-CSI is requested in the DCI that schedules multiple PUSCH repetitions, the CSI report(s) may be multiplexed only on the first PUSCH repetition. This applies to both Type A and Type B PUSCH repetitions. In particular, for Type B repetitions, the CSI report(s) may be multiplexed only on the first actual PUSCH repetition (e.g., more than a single symbol duration). In case when there is no TB on PUSCH (e.g., UL-SCH indicator=0 in the DCI), a UE may assume that the number of PUSCH repetitions is 1, irrespective of the value of numberofrepetitions. In addition, the first nominal repetition may be expected to be the same as the first actual repetition (i.e., no segmentation).

In some cases, for time division multiplexing (TDM) mTRP PUISCH repetitions, different sets of transmission parameters (e.g., beam, spatial relation, power control, pre-coding, etc.) may be specified for different single-DCI based PUSCH repetitions. For mTRP, PUSCH repetitions (sched-uled by a single DCI), can belong to two sets, each set has its own transmission parameters. To achieve this, the two sets of repetitions may be associated with two SRS resource sets. In this case, a DCI may indicate two beams and/or two sets of power control parameters via two corresponding sounding reference signal (SRS) resource indicator (SRI) fields.

Figure 8:
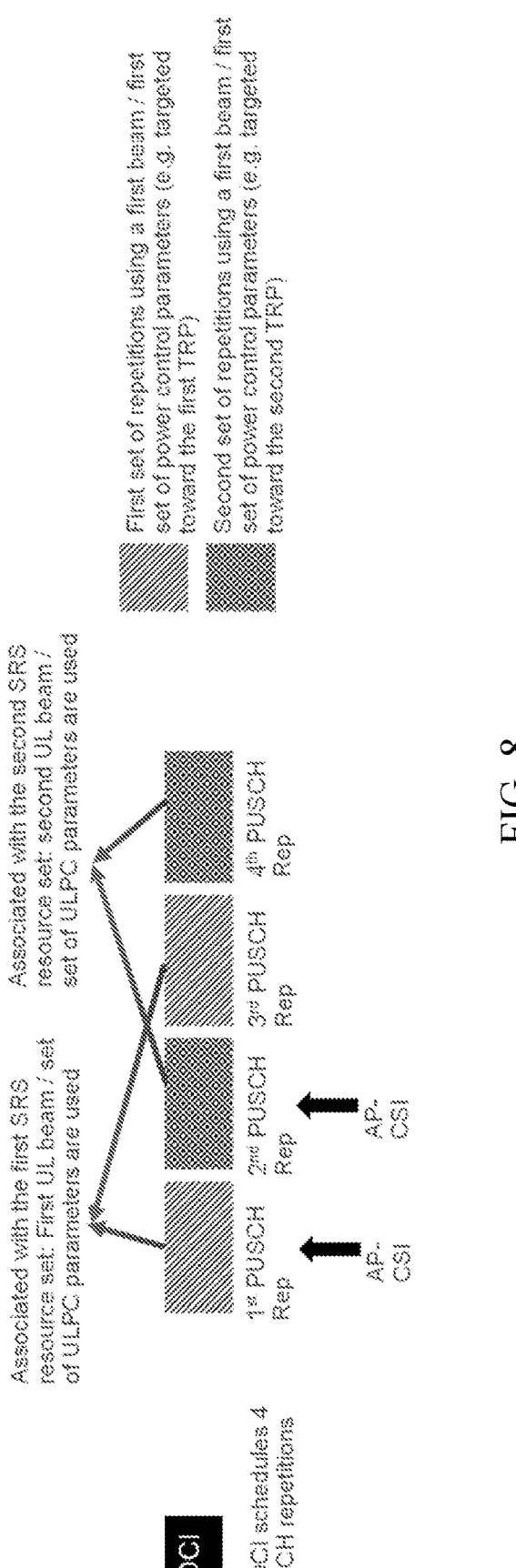
FIG. 8 illustrates an example time division multiplexing (TDM) multiple transmission and reception points (mTRP) aperiodic CSI (A-CSI) multiplexing on PUSCH repetitions, in accordance with certain aspects of the present disclosure.

FIG. 8 illustrates an example TDM mTRP A-CSI multi-plexing on PUSCH repetitions, in accordance with certain aspects of the present disclosure. As shown, an UL DCI may schedule four PUSCH repetitions intended for multiple (first and second) TRPs). The first and the third PUSCH repeti-tions are associated with the first SRS resource set, for which a first UL beam or set of UL power control (ULPC) parameters are used (e.g., targeting toward the first TRP). The second and the fourth PUSCH repetitions are associated with the second SRS resource set, for which a second UL beam or set of ULPC parameters are used (e.g., targeting toward the second TRP).

As such, the PUSCH repetitions can be considered as belonging to (associated with) two SRS resource sets (as indicated by the hatching patterns). Each set may be con-figured with respective beam and/or power control param-eters. The two sets of PUSCH repetitions are respectively associated with two SRS resource sets. In some cases, the single DCI may indicate the two beams and/or power control parameters by using two corresponding SRS resource indi-cator (SRI) fields.

When a DCI triggers A-CSI, the A-CSI may be multi-plexed on two PUSCH repetitions (e.g., as shown in FIG. 8) when the following conditions are satisfied. When the fol-lowing conditions are not satisfied, the A-CSI is multiplexed only on the first PUSCH repetition. A first condition may be that the two PUSCH repetitions have the same length (even though this is always the case for Type A repetitions, Type B repetitions may or may not satisfy this condition). A second condition may be that UCIs other than the A-CSI are not multiplexed on any of the two PUSCH repetitions. These conditions may ensure that the same mother code length for UCI (A-CSI) multiplexing on multiple PUSCH repetitions, and hence, may allow for soft-combining at the gNB side.

The multiplexing operations illustrated in FIG. 8 may be useful for coverage enhancement especially for FR2 and for L1-RSRP or SINR report that requires high reliability. In addition, when CSI payload is large, multiplexing A-CSI on multiple repetitions (more than 2, potentially up to 32 repetitions that can be scheduled for PUSCH) is needed.

The A-CSI multiplexing illustrated in FIG. 8 may not support certain scenarios. As a first example, when all PUSCH repetitions are associated with one SRS resource set, such as for sTRP PUSCH repetitions, multiplexing A-CSI on more than one PUSCH repetition may be not be supported. As a second example, when more than two PUSCH repetitions (i.e., three or more) associated with two SRS resource sets, such as for mTRP PUSCH repetitions, multiplexing A-CSI on the three or more PUSCH repetitions may not be supported.

Example Enhancement for A-CSI on Multiple PUSCH Repetitions

Aspects of the present disclosure provide methods and techniques for indicating, to a UE how to perform multi-plexing operations in these currently unsupported scenarios.

In some cases, the indication may also include the number of PUSCH repetitions on which A-CSI is multiplexed. Furthermore, aspects of the present disclosure include how to select the set of PUSCH repetitions to multiplex A-CSI thereon for maximizing the number of PUSCH repetitions on which A-CSI is multiplexed.

The techniques provided herein may involve indicating A-CSI multiplexing on multiple PUSCH repetitions, such as multiplexing A-CSI on two or more PUSCH repetitions associated with a single SRS resource set, or multiplexing A-CSI on three or more PUSCH repetitions associated with at least two SRS resource sets. For example, in one aspect, the UE may be provided an indication of how to multiplex A-CSI on two or more PUSCH repetitions among the PUSCH repetitions associated with one SRS resource set. In another aspect, the UE may be indicated to multiplex A-CSI on two sets of PUSCH repetitions associated with two SRS resource sets. The indication may be configured by radio resource control (RRC) or the downlink control information (DCI) that schedules the UE with the PUSCH repetitions.

In a first example, the indication may be configured via RRC per bandwidth part (BWP) or per carrier component (CC), irrespective of the triggered A-CSI. In a second example, the indication may be configured by RRC per aperiodic trigger state (AperiodicTriggerState), for example, when the CSI request field in the DCI (that schedules PUSCH repetitions) indicates an aperiodic trigger state that is RRC-configured. In a third example, the DCI may directly indicate the indication using a field independent from the CSI request field.

In some cases, the indication may include additional information. For example, the indication may include a maximum number of PUSCH repetitions that may be mul-tiplexed with A-CSI. For example, a DCI may schedule 16 PUSCH repetitions and indicate A-CSI on up to 4 PUSCH repetitions for multiplexing. The indicated maximum num-ber may effectively serve as an upper limit because the actual number of eligible PUSCH repetitions for A-CSI multiplexing further depends on other conditions, as described below.

To indicate the maximum number, each of the three example types of indication may be used. For example, the maximum number may be RRC configured per BWP or CC, RRC configured per aperiodic trigger state (depending on which aperiodic trigger state is indicated by CSI request field of the DCI scheduling the PUSCH repetitions), or indicated in the DCI directly via a field independent from the CSI request field.

In some cases, when the maximum number is not indi-cated, either missing in the RRC or DCI indications or the upper limit not adopted for implementation, the UE may assume that all PUSCH repetitions are eligible for A-CSI multiplexing. That is, the maximum number may include a default value of the total number of PUSCH repetitions. In some cases, the maximum number may be indicated sepa-rately per SRS resource set.

Another additional indication may indicate whether the A-CSI multiplexing is followed for PUSCH repetitions associated with the first SRS resource set, for PUSCH repetitions associated with the second SRS resource set, or for both. This indication may be used when the UE is scheduled with two sets of PUSCH repetitions associated with two SRS resource sets. For example, a UE may be indicated to multiplex A-CSI on a maximum number of 4 PUSCH repetitions associated with a first SRS resource set, and to multiplex A-CSI on a maximum number of 2 PUSCH repetitions associated with a second SRS resource set.

Similar to above, this additional indication may be configured by RRC per BWP or CC, by RRC per aperiodic trigger state, or indicated in DCI directly.

In addition to indicating the A-CSI multiplexing operations, aspects of the present disclosure may also indicate on which PUSCH repetition(s) the A-CSI is to be multiplexed. For example, within the candidate PUSCH repetitions (e.g., within the upper limit set by the indicated maximum number above), the UE may further determine a subset of PUSCH repetitions that satisfy one or more conditions. The one or more conditions may at least include that the two PUSCH repetitions have the same length and that UCIs other than the A-CSI are not multiplexed on any of the PUSCH repetitions.

Figure 9:
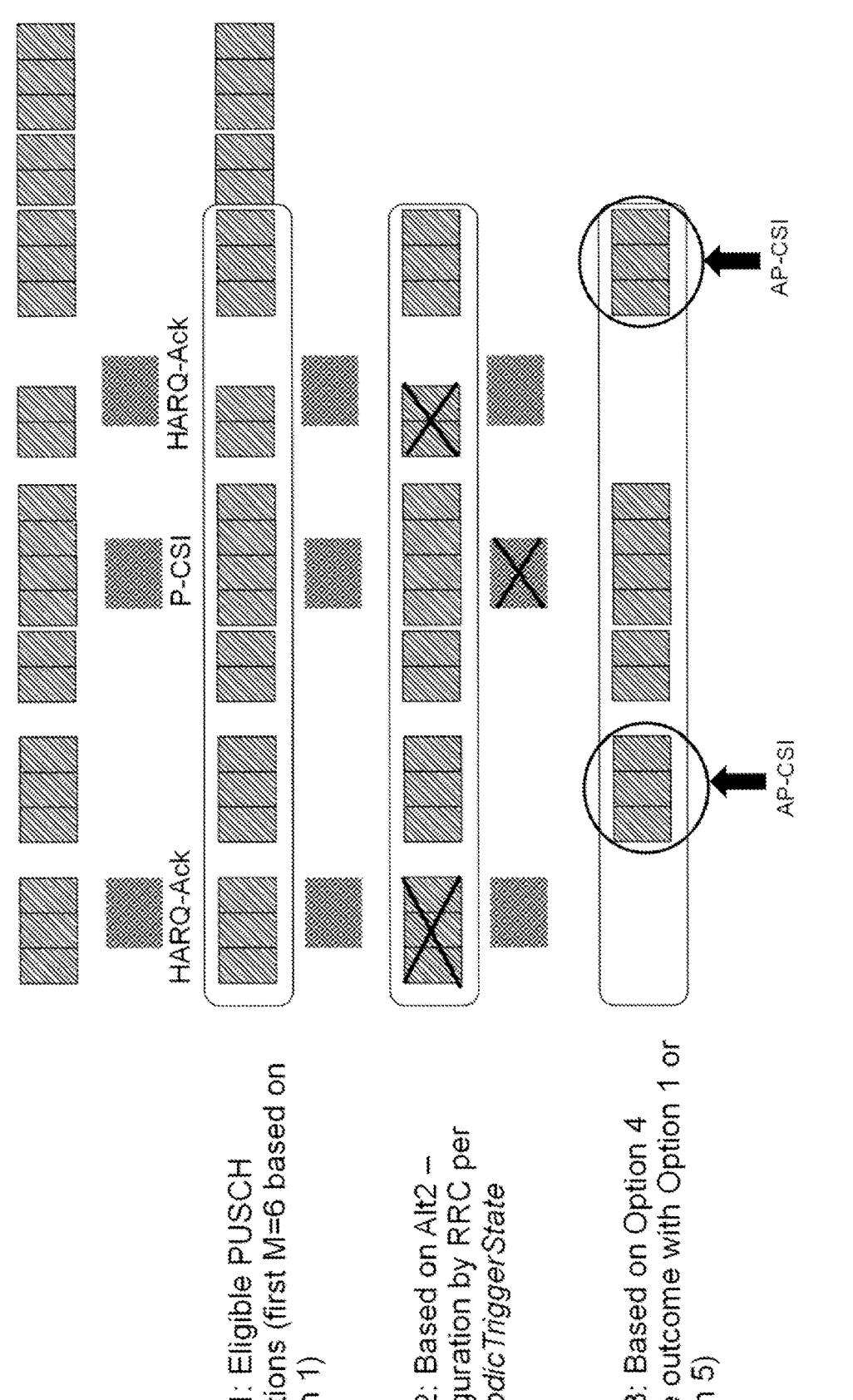
FIG. 9 illustrates an example A-CSI multiplexing on PUSCH repetitions, in accordance with certain aspects of the present disclosure.

FIG. 9 illustrates an example of multiplexing A-CSI on PUSCH repetitions, in accordance with certain aspects of the present disclosure. As shown, multiple PUSCH repetitions are scheduled. HARQ-Ack feedback and periodic CSI (P-CSI) may be multiplexed on some of the scheduled PUSCH repetitions, as follows.

At a first step (Step 1), the UE may determine one or more eligible PUSCH repetitions for multiplexing A-CSI, as follows. First, if a maximum number is not indicated, or is indicated but is larger than the total number of scheduled PUSCH repetitions, then all of the scheduled PUSCH repetitions are considered eligible.

Second, if the maximum number has been indicated and the indicated maximum number is less than the total scheduled PUSCH repetitions, then the eligible PUSCH repetitions for A-CSI multiplexing may be determined according to various options. For example, in a first option, the first number of the maximum number of PUSCH repetitions (out of the total number of scheduled PUSCH repetitions) are considered eligible. In a second option, all of the scheduled PUSCH repetitions are assumed to be eligible and the actual eligible PUSCH repetitions may be selected by eliminating others that fail to satisfy one or more conditions.

In the example shown in FIG. 9, the maximum number of PUSCH repetitions for A-CSI multiplexing is set to six ("M=6"). Therefore, in a first step (Step 1), the first six PUSCH repetitions (e.g., surrounded by the rounded rectangle) are identified as eligible PUSCH repetitions.

In a second step (Step 2), the UE may identify the PUSCH repetitions without other UCIs (e.g., to ensure the condition that UCIs other than the A-CSI are not multiplexed on any of the PUSCH repetitions). There are various example alternatives for implementing this identification operation.

In a first alternative, other UCIs may be any other UCI including HARQ-Ack, SR, periodic or semi-periodic CSI (P/SP-CSI) on PUCCH that overlaps with that PUSCH (and as a result is multiplexed on that PUSCH repetition).

In a second alternative, other UCIs may only include UCIs with higher priority than the A-CSI, such as HARQ-Ack. SR or P/SP-CSI on PUCCH may be dropped if they overlap with a PUSCH repetition on which A-CSI is actually multiplexed. As shown in FIG. 9, based on this alternative (Alt2), the PUSCH repetitions overlapping with HARQ-Ack are ruled out from the eligible PUSCH repetitions for A-CSI multiplexing. However, the PUSCH repetitions with the P-CSI remain while the P-CSI on PUCCH is dropped.

In a third step (Step 3), the UE may apply the one or more conditions to determine the final eligible PUSCH repetitions for A-CSI multiplexing. For example, the UE may identify the remaining PUSCH repetitions having the same length. Further, there are various options (described below) for determining the actual eligible PUSCH repetitions for A-CSI multiplexing.

In a first option, the UE may consider the first PUSCH repetition and any other PUSCH repetition with the same length as the first PUSCH repetition as the actual eligible PUSCH repetitions for A-CSI multiplexing. In a second option, the UE may consider the PUSCH repetitions with the largest number of symbols as the actual eligible PUSCH repetitions for A-CSI multiplexing. In a third option, the UE may consider the PUSCH repetitions that are the same as nominal repetition (not segmented) to be the actual eligible PUSCH repetitions for A-CSI multiplexing.

In a fourth option, the UE may consider the largest number of PUSCH repetitions with the same length to be the actual eligible PUSCH repetitions for A-CSI multiplexing. For example, if the remaining PUSCH repetitions include 2 PUSCH repetitions each having a length of four symbols (e.g., $L=4$), and 4 PUSCH repetitions each having a length of six symbols (e.g., $L=6$), and 3 PUSCH repetitions each having a length of ten symbols ($L=10$), the UE may determine the actual eligible PUSCH repetitions for A-CSI multiplexing to be the ones with the length of six symbols ($L=6$) because the quantity four (4) is greater than the other two (2 and 3, respectively).

On the other hand, if there are multiple such largest numbers (e.g. 4 reps with $L=6$ and 4 reps with $L=8$), then the UE may use the PUSCH repetitions with a larger number of symbols (e.g. the 4 reps with $L=8$) to be the actual eligible PUSCH repetitions for A-CSI multiplexing.

In a fifth option, for each length (L), the UE may find the number of PUSCH repetitions with that L denoted as $N_L$, calculate $L*N_L$, and then consider the PUSCH repetitions with the same L that have the largest $L*N_L$. For example, if there are two PUSCH repetitions each having a length of four symbols ($L=4$), four PUSCH repetitions each having a length of six symbols ($L=6$), and three PUSCH repetitions each having a length of ten symbols ($L=10$), then the product of 3 by 10 is greater than the product of 4 by 6 or 2 by 4, therefore, the UE may determine the three PUSCH repetitions of ten symbols as the actual eligible PUSCH repetitions for A-CSI multiplexing. This option results in the largest number of available REs for A-CSI multiplexing across the multiple PUSCH repetitions.

As shown in FIG. 9, two or more of the above options may result in the same determination. In the illustrated example based on the fourth option, the UE determines (at Step 3), that the two PUSCH repetitions each having 3 symbols ($L=3$) are eligible for A-CSI multiplexing, while the other remaining potentially eligible PUSCH repetitions have only a single instance ($L=2$ and $L=4$). Applying the first option or the fifth option, the UE may reach the same determination.

One or more optional steps may also be included. For example, if there is only one PUSCH repetition identified in Steps 1-3, then the UE may multiplex A-CSI on the first scheduled PUSCH repetition without regard to the alternatives and options discussed (e.g., following the default rule when possibilities are limited by the only one PUSCH repetition).

Furthermore, the techniques described above may be equally applicable to SP-CSI on PUSCH when DCI activates SP-CSI to be multiplexed on multiple PUSCH repetitions in each reporting occasions (periodically after activation). The A-CSI or SP-CSI reporting procedures are performed independently for each reporting occasions.

Figure 10:
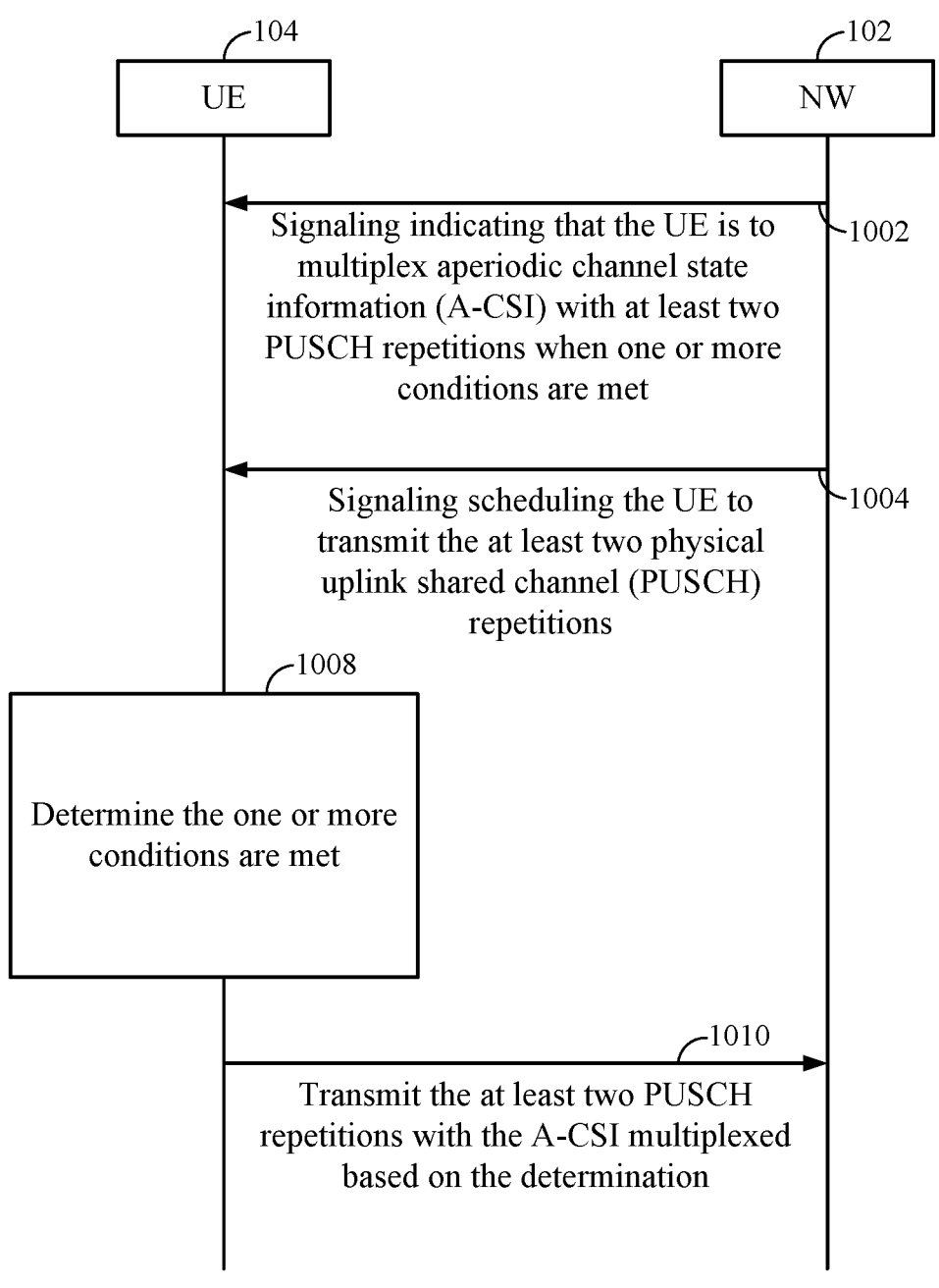
FIG. 10 is an example call flow diagram illustrating example uplink transmissions with repetition, in accordance with certain aspects of the present disclosure.

FIG. 10 is a call flow diagram illustrating example operations (e.g., as described in relation to FIG. 9) for wireless communication at a UE, in accordance with certain aspects of the present disclosure.

As shown, at 1002, the network entity 102 transmits signaling indicating the UE to multiplex A-CSI with at least two PUSCH repetitions, such as when one or more conditions are met. At 1004, the network entity transmits to the UE signaling scheduling the UE 104 to transmit the at least two PUSCH repetitions. The at least two PUSCH repetitions may be associated with a first SRS resource set (e.g., sTRP).

In some cases, another network entity (not shown), in an mTRP situation, may schedule the UE to transmit another set of PUSCH repetitions associated with a second SRS resource set. The following operations apply to the PUSCH repetitions in both the sTRP and mTRP situations.

The one or more conditions may at least include the two conditions that require that the two PUSCH repetitions have the same length and that UCIs other than the A-CSI are not multiplexed on any of the PUSCH repetitions.

In some cases, the network entity may indicate to the UE a maximum number of PUSCH repetitions eligible for multiplexing with A-CSI. As discussed in FIG. 9, the maximum number may set an upper limit to eligible PUSCH repetitions if the maximum number is less than the total number of scheduled PUSCH repetitions. The indication of the maximum number is optional, however. When absent, all scheduled PUSCH repetitions may be considered as eligible by default.

At 1008, the UE determines that one or more conditions have been met. The UE may determine an actual number of PUSCH repetitions eligible for multiplexing with A-CSI based on the signaling indication and one or more conditions. For example, the conditions may relate to the various steps and alternatives/options discussed in relation to FIG. 9 for determining the actual eligible PUSCH repetitions for A-CSI multiplexing.

At 1010, the UE transmits the at least two PUSCH repetitions with the A-CSI multiplexed based on the determination. The network entity may accordingly monitor for the at least two PUSCH repetitions, in accordance with the signaling sent to the UE at 1002 and 1004.

Example Methods

FIG. 11 is a flow diagram illustrating example operations 1100 for wireless communication, in accordance with certain aspects of the present disclosure. The operations 1100 may be performed, for example, at a UE (e.g., such as the UE 104 in the wireless communication network 100) capable of determining actual eligible PUSCH repetitions for A-CSI multiplexing. The operations 1100 may be implemented as software components that are executed and run on one or more processors (e.g., controller/processor 2110 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 2110) obtaining and/or outputting signals.

The operations 1100 begins, at 1102, by obtaining signaling indicating that the UE is to multiplex aperiodic channel state information (A-CSI) with at least two physical uplink shared channel (PUSCH) repetitions when one or more conditions are met.

At 1104, the UE obtains signaling scheduling the UE to transmit the at least two PUSCH repetitions, wherein the at least two PUSCH repetitions are associated with a first sounding reference signal (SRS) resource set.

At 1106, the UE outputs, for transmission, the at least two PUSCH repetitions for multiplexing with the A-CSI based on the signaling indication and the one or more conditions.

In aspects, the signaling indicating that the UE is to multiplex A-CSI with the at least two PUSCH repetitions is obtained via radio resource control (RRC) protocol that configures the UE per bandwidth part (BWP) or component carrier (CC).

In aspects, the signaling scheduling the UE to transmit the at least two PUSCHs with repetitions includes downlink control information (DCI). The DCI may indicate an aperiodic trigger state. The signaling indicating that the UE is to multiplex A-CSI with the at least two PUSCHs with repetitions may be obtained via radio resource control (RRC) protocol that configures the aperiodic trigger state.

In aspects, the signaling indicating that the UE is to multiplex A-CSI with the at least two PUSCHs with repetitions is obtained via a dedicated field in downlink control information (DCI) unrelated to channel state information (CSI) request.

In aspects, operations 1100 further includes obtaining a maximum number of PUSCH repetitions eligible for multiplexing with the A-CSI (e.g., step 1006 of FIG. 10). In some cases, the maximum number includes a default value equivalent to a total number of scheduled PUSCH repetitions when the maximum number is not explicitly indicated or when the maximum number exceeds the total number of scheduled PUSCH repetitions.

In some cases, the operations 1100 further include determining an actual number of PUSCH repetitions eligible for multiplexing with the A-CSI to be the maximum number of PUSCH repetitions that are scheduled the earliest among a total number of scheduled PUSCH repetitions when the maximum number is lesser than the total number. In some cases, the operations 1100 further include removing, from the actual number of PUSCH repetitions eligible for multiplexing the A-CSI, one or more PUSCH repetitions that carry uplink control information (UCI) not having A-CSI therein.

In some cases, the UCI may include one or more of: hybrid automatic repeat request (HARQ) acknowledgement (ACK), scheduling request (SR), or periodic or semi-periodic CSI associated with a physical uplink control channel (PUCCH) that overlaps with a PUSCH. In some cases, the UCI includes UCIs with higher priority than the A-CSI only.

In some cases, the operations 1100 further include: removing, from the actual number of PUSCH repetitions not carrying UCI, one or more PUSCH repetitions that are of different lengths. When a remaining number of the actual number of PUSCH repetitions exceeds one, the UE may multiplex A-CSI on the remaining number of the actual number of PUSCH repetitions. When a remaining number of the actual number of PUSCH repetitions equals to one, the UE may multiplex A-CSI on a first scheduled PUSCH repetition.

According to aspects of the present disclosure, such as in an mTRP situation, the operations 1100 may further include obtaining signaling scheduling the UE to transmit another set of PUSCH repetitions associated with a second SRS resource set.

In some cases, the signaling indicating that the UE is to multiplex the A-CSI to PUSCH repetitions associated with the first SRS resource set indicates that the UE is to multiplex the A-CSI to PUSCH repetitions associated with the first set of SRS resource set, the second SRS resource set, or both the first and second SRS resource sets.

In some cases, the operations 1100 further include obtaining a maximum number of PUSCH repetitions associated with the first and second SRS sets eligible for multiplexing with the A-CSI multiplexing for the PUSCH repetitions.

In aspects, the one or more conditions include at least one of: two or more sets of PUSCH repetitions to be multiplexed with A-CSI share a common length; or no PUSCH repetition to be multiplexed with A-CSI is to be multiplexed with uplink control information (UCI) not having A-CSI therein. In some cases, the conditions include one or more criteria the UE considers to determine the actual number of eligible PUSCH repetitions (e.g., the first through the fifth options of FIG. 9).

FIG. 12 is a flow diagram illustrating example operations 1200 for wireless communication by one or more network entities (e.g., base stations, or multi-TRPs) that may be considered complementary to operations 1100 of FIG. 11. For example, the operations 1200 may be performed by a BS (e.g., such as the BS 102 in the wireless communication network 100) for monitoring for uplink repetitions sent according to a determination of which of at least two patterns applied to a PUSCH with repetition. The operations 1200 may be implemented as software components that are executed and run on one or more processors (e.g., controller/processor 240 of FIG. 2). Further, the transmission and reception of signals by the BS in operations 1200 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1200 begin, at 1202, by outputting, for transmission to a user equipment (UE), signaling indicating that the UE is to multiplex aperiodic channel state information (A-CSI) with the at least two PUSCH repetitions when one or more conditions are met.

At 1204, the network entity (or entities in mTRP situations) outputs for transmission to the UE, signaling scheduling the UE to transmit the at least two PUSCH repetitions, wherein the at least two PUSCH repetitions are associated with a first sounding reference signal (SRS) resource set.

At 1206, the network entities obtains the at least two PUSCH repetitions with the A-CSI multiplexed based on the signaling indication and the one or more conditions.

The operations 1200 may include other aspects complementary to operations 1100. For example, operations 1200 may be performed by two or more network entities in an mTRP situation.

Operations 1100 and 1200 of FIGS. 11 and 12 may be understood with reference to the example call flow diagram 1000 of FIG. 10.

Example Wireless Communication Devices

Figure 13:
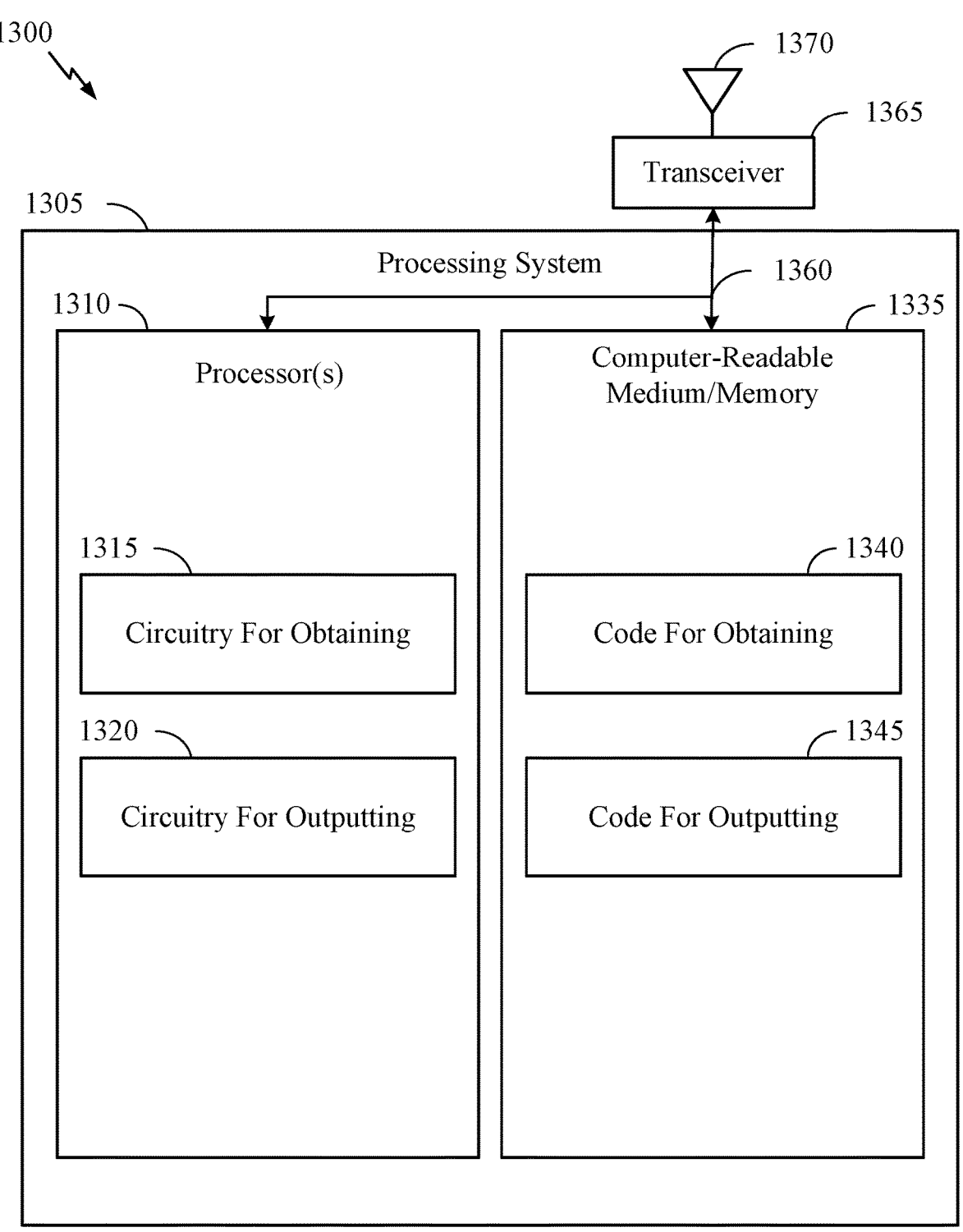
FIG. 13 illustrates an example wireless communications device configured to perform operations for the methods disclosed herein, in accordance with certain aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. In some cases, the communications device 1300 may include the UE 104 illustrated in FIG. 1 and FIG. 2.

Communications device 1300 includes a processing system 1305 coupled to a transceiver 1365 (e.g., a transmitter and/or a receiver). Transceiver 1365 is configured to transmit and receive signals for the communications device 1300 via an antenna 1370, such as the various signals as described herein. Processing system 1305 may be configured to perform processing functions for communications device 1300, including processing signals received and/or to be transmitted by communications device 1300. The transceiver 1365 can include one or more components of UE 104 with reference to FIG. 2 such as, for example, transceiver 254, TX MIMO processor 266, transmit processor 264, receive processor 258, MIMO detector 256, and/or the like.

Processing system 1305 includes a processor 1310 coupled to a computer-readable medium/memory 1335 via a bus 1360. In certain aspects, computer-readable medium/memory 1335 is configured to store instructions (e.g., computer-executable code) that when executed by processor 1310, cause processor 1310 to perform the operations illustrated in FIG. 11, or other operations for performing the various techniques discussed herein for modifying a configured repetition pattern to avoid segmentation of nominal repetitions into multiple actual repetitions. In some cases, the processor 1310 can include one or more components of UE 104 with reference to FIG. 2 such as, for example, controller/processor 280 (including the A-CSI component 281), transmit processor 264, receive processor 258, and/or the like. Additionally, in some cases, the computer-readable medium/memory 1335 can include one or more components of UE 104 with reference to FIG. 2 such as, for example, memory 282 and/or the like.

In certain aspects, computer-readable medium/memory 1335 stores code 1340 for obtaining, and code 1345 for transmitting.

In some cases, the code 1340 for obtaining may include code for obtaining signaling scheduling the UE to transmit at least two physical uplink shared channel (PUSCH) repetitions, wherein the at least two PUSCH repetitions are associated with a first sounding reference signal (SRS) resource set and for obtaining signaling indicating that the UE is to multiplex aperiodic channel state information (A-CSI) with the at least two PUSCH repetitions when one or more conditions are met.

In some cases, the code 1340 for obtaining may include code for obtaining a maximum number of PUSCH repetitions eligible for multiplexing with the A-CSI, obtaining signaling scheduling the UE to transmit another set of PUSCH repetitions associated with a second SRS resource set, and/or for obtaining a maximum number of PUSCH repetitions associated with the first and second SRS sets eligible for multiplexing with the A-CSI multiplexing for the PUSCH repetitions.

In some cases, code 1345 for outputting may include code for outputting the at least two PUSCH repetitions with the A-CSI multiplexed based on the signaling indication and the one or more conditions.

In certain aspects, processor 1310 has circuitry configured to implement the code stored in the computer-readable medium/memory 1335. For example, processor 1310 includes circuitry 1315 for obtaining and circuitry 1320 for outputting.

In some cases, the circuitry 1315 for obtaining may include circuitry for obtaining signaling scheduling the UE to transmit at least two PUSCH repetitions, wherein the at least two PUSCH repetitions are associated with a first SRS resource set; and for obtaining signaling indicating that the UE is to multiplex A-CSI with the at least two PUSCH repetitions when one or more conditions are met.

In some cases, the circuitry 1315 for obtaining may also include circuitry for obtaining a maximum number of PUSCH repetitions eligible for multiplexing with the A-CSI, obtaining signaling scheduling the UE to transmit another set of PUSCH repetitions associated with a second SRS resource set, and/or for obtaining a maximum number of PUSCH repetitions associated with the first and second SRS sets eligible for multiplexing with the A-CSI multiplexing for the PUSCH repetitions.

In some cases, circuitry 132 for outputting may include circuitry for transmitting the at least two PUSCH repetitions with the A-CSI multiplexed based on the signaling indication and the one or more conditions.

In some examples, means for determining may include the controller/processor 280 and/or the A-CSI component 281 of the UE 104 illustrated in FIG. 2, and/or circuitry 1320 for determining of the communication device 1300 in FIG. 13.

In some examples, means for selecting may include the controller/processor 280 and/or the A-CSI component 281 of the UE 104 illustrated in FIG. 2, and/or circuitry 1330 for selecting of the communication device 1300 in FIG. 13.

In some examples, means for receiving or transmitting may include the transmitter unit 254 and/or antenna(s) 252 of the UE 104 illustrated in FIG. 2 and/or the transceiver 1365, circuitry 1315 for receiving or circuitry 1325 for transmitting of the communication device 1300 in FIG. 13.

In some examples, means for transmitting, outputting, or sending (or means for outputting for transmission) may include the transceivers 232 and/or antenna(s) 224 illustrated in FIG. 2 and/or transceiver 1708 and antenna 1710 of the communication device 1700 in FIG. 17.

In some examples, means for receiving (or means for obtaining) may include the transceivers 222 and/or antenna(s) 224 illustrated in FIG. 2 and/or transceiver 1708 and antenna 1710 of the communication device 1700 in FIG. 17.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

Figure 14:
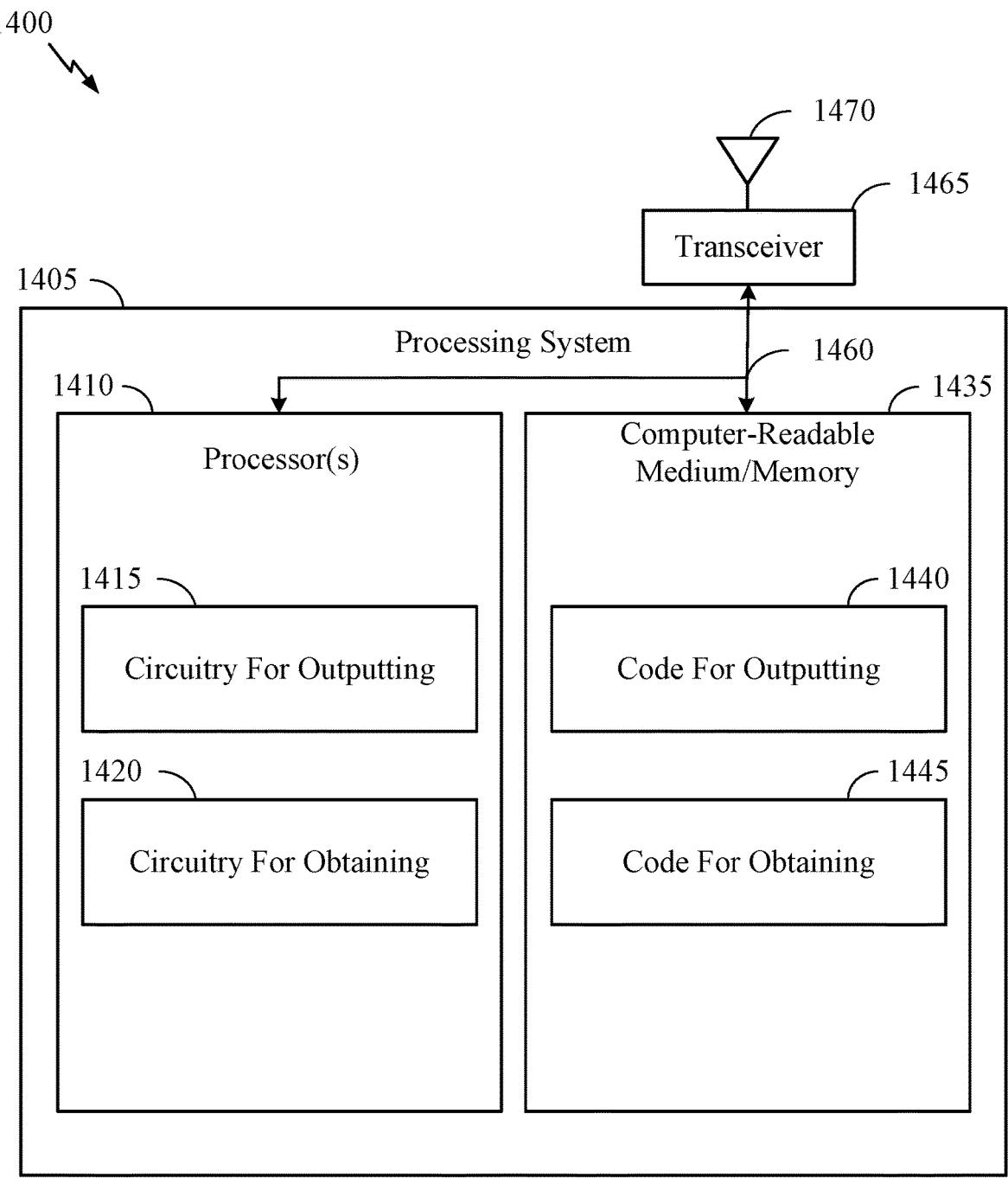
FIG. 14 illustrates an example wireless communications device configured to perform operations for the methods disclosed herein, in accordance with certain aspects of the present disclosure.

FIG. 14 illustrates a communications device 1400 that may include various components (e.g., corresponding to means-plus-function components) configured to perform operations for the techniques disclosed herein, such as the operations illustrated in FIG. 12. In some cases, the communications device 1400 may include the BS 102 illustrated in FIG. 1 and FIG. 2.

Communications device 1400 includes a processing system 1405 coupled to a transceiver 1465 (e.g., a transmitter and/or a receiver). Transceiver 1465 is configured to transmit and receive signals for the communications device 1400 via an antenna 1470, such as the various signals as described herein. Processing system 1405 may be configured to perform processing functions for communications device 1400, including processing signals received and/or to be transmitted by communications device 1400. The transceiver 1465 can include one or more components of BS 102 with reference to FIG. 2 such as, for example, transceiver 232, TX MIMO processor 230, transmit processor 220, receive processor 238, MIMO detector 236, and/or the like.

Processing system 1405 includes a processor 1410 coupled to a computer-readable medium/memory 1435 via a bus 1460. In certain aspects, computer-readable medium/ memory 1435 is configured to store instructions (e.g., computer-executable code) that when executed by processor 1410, cause processor 1410 to perform the operations illustrated in FIG. 12, or other operations for performing the various techniques discussed herein for multiplexing A-CSI on multiple PUSCH repetitions. In some cases, the processor 1410 can include one or more components of BS 102 with reference to FIG. 2 such as, for example, controller/processor 240 (including the A-CSI component 241), transmit processor 220, receive processor 238, and/or the like. Additionally, in some cases, the computer-readable medium/ memory 1435 can include one or more components of BS 102 with reference to FIG. 2 such as, for example, memory 242 and/or the like.

In certain aspects, computer-readable medium/memory 1435 stores code 1440 for outputting and code 1445 for obtaining.

In some cases, the code 1440 for outputting may include code for outputting, for transmission, signaling scheduling a UE to transmit at least two PUSCH repetitions. The at least two PUSCH repetitions may be associated with a first SRS resource set. The code 1440 for outputting may include code for outputting signaling indicating that the UE is to multiplex A-CSI with the at least two PUSCH repetitions when one or more conditions are met; and for outputting, to the UE, a maximum number of PUSCH repetitions eligible for multiplexing with the A-CSI.

In some cases, the code 1445 for obtaining may include code for obtaining the at least two PUSCH repetitions with the A-CSI multiplexed based on the signaling indication and the one or more conditions.

In some cases, the code 1445 for obtaining may include code for monitoring for the at least two PUSCH repetitions with the A-CSI multiplexed based on the signaling indication and the one or more conditions.

In certain aspects, processor 1410 has circuitry configured to implement the code stored in the computer-readable medium/memory 1435. For example, processor 1410 includes circuitry 1415 for outputting and circuitry 1420 for obtaining.

In some cases, the circuitry 1415 for outputting may include circuitry for outputting, for transmission, signaling scheduling a UE to transmit at least two PUSCH repetitions. The at least two PUSCH repetitions may be associated with a first SRS resource set; transmitting signaling indicating that the UE is to multiplex A-CSI with the at least two PUSCH repetitions when one or more conditions are met; and transmitting to the UE a maximum number of PUSCH repetitions eligible for multiplexing with the A-CSI.

In some cases, the circuitry 1420 for obtaining may include circuitry for obtaining the at least two PUSCH repetitions with the A-CSI multiplexed based on the signaling indication and the one or more conditions.

In some cases, the processor(s) 1410 may also include circuitry for monitoring may include circuitry for monitoring for the at least two PUSCH repetitions with the A-CSI multiplexed based on the signaling indication and the one or more conditions.

In some examples, means for transmitting and receiving may include a transmitter or receiver, and/or an antenna(s) 234 and/or the controller/processor 240 of the BS 102 illustrated in FIG. 2 and/or the transceiver 1465, circuitry 1415 for transmitting, or circuitry 1425 for receiving of the communication device 1400 in FIG. 14.

In some examples, means for determining may include a controller or processor 240 of the BS 102 illustrated in FIG. 2 and/or circuitry 1420 for determining of the communication device 1400 in FIG. 14.

In some examples, means for providing may include a controller or processor 240 or the scheduler 244 of the BS 102 illustrated in FIG. 2 and/or circuitry 1430 for providing of the communication device 1400 in FIG. 14.

Additional Wireless Communication Network Considerations

The techniques and methods described herein may be used for various wireless communications networks (or wireless wide area network (W WAN)) and radio access technologies (RATs). While aspects may be described herein using terminology commonly associated with 3G, 4G, and/ or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmW), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

Antennas 252, processors 266, 258, 264, and/or controller/processor 280 of UE 104 and/or antennas 234, processors 220, 230, 238, and/or controller/processor 240 of BS 102 may be used to perform the various techniques and methods described herein.

For example, as shown in FIG. 2, the controller/processor 240 of the BS 102 has A-CSI component 241 that may be configured to perform the operations shown in FIG. 9, as well as other operations described herein for multiplexing A-CSI on multiple PUSCH repetitions. As shown in FIG. 2, the controller/processor 280 of the UE 104 has an A-CSI component 281 that may be configured to perform the operations shown in FIG. 8, as well as other operations described herein for multiplexing A-CSI on multiple PUSCH repetitions. Although shown at the controller/processor, other components of UE 104 and BS 102 may be used to perform the operations described herein.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/ duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Technical Additional Considerations

The preceding description provides examples of determining which of at least two invalid symbol patterns to apply to PUSCH transmission with repetitions. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor).

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 8 and 9, as well as other operations described herein for multiplexing A-CSI on multiple PUSCH repetitions.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated herein. Various modifications, changes and variations may be made in the arrangement, operation, and details of the methods and apparatus described herein.

Example Aspects

Implementation examples are described in the following numbered aspects:

Aspect 1: A method for wireless communications at a user equipment (UE), comprising: obtaining signaling indicating that the UE is to multiplex aperiodic channel state information (A-CSI) with at least two physical uplink shared channel (PUSCH) repetitions when one or more conditions are met; obtaining signaling scheduling the UE to transmit the at least two PUSCH repetitions, wherein the at least two PUSCH repetitions are associated with a first sounding reference signal (SRS) resource set; and outputting the at least two PUSCH repetitions for multiplexing with the A-CSI based on the signaling indication and the one or more conditions.

Aspect 2: The method of Aspect 1, wherein the signaling indicating that the UE is to multiplex A-CSI with the at least two PUSCH repetitions comprises radio resource control (RRC) signaling that configures the UE per bandwidth part (BWP) or component carrier (CC).

Aspect 3: The method of any one of Aspects 1-2, wherein the signaling scheduling the UE to transmit the at least two PUSCHs with repetitions comprises downlink control information (DCI), the DCI indicating an aperiodic trigger state; and wherein the signaling indicating that the UE is to multiplex A-CSI with the at least two PUSCHs with repetitions comprises radio resource control (RRC) signaling that configures the aperiodic trigger state.

Aspect 4: The method of any one of Aspects 1-3, wherein the signaling indicating that the UE is to multiplex A-CSI with the at least two PUSCHs with repetitions comprises a dedicated field in downlink control information (DCI) unrelated to channel state information (CSI) request.

Aspect 5: The method of any one of Aspects 1-4, further comprising: obtaining a maximum number of PUSCH repetitions eligible for multiplexing with the A-CSI.

Aspect 6: The method of Aspect 5, wherein the maximum number comprises a default value equivalent to a total number of scheduled PUSCH repetitions when the maximum number is not explicitly indicated or when the maximum number exceeds the total number of scheduled PUSCH repetitions.

Aspect 7: The method of any one of Aspects 1-5, further comprising: obtaining signaling scheduling the UE to transmit another set of PUSCH repetitions associated with a second SRS resource set.

Aspect 8: The method of Aspect 7, wherein: the signaling indicating that the UE is to multiplex the A-CSI to PUSCH repetitions associated with the first SRS resource set indicates that the UE is to multiplex the A-CSI to PUSCH repetitions associated with the first set of SRS resource set, the second SRS resource set, or both the first and second SRS resource sets.

Aspect 9: The method of Aspect 8, further comprising: obtaining a respective maximum number of PUSCH repetitions associated with the first and second SRS sets eligible for multiplexing with the A-CSI.

Aspect 10: The method of any one of Aspects 1-9, wherein the one or more conditions comprise at least one of: two or more sets of PUSCH repetitions to be multiplexed with the A-CSI share a common length; or no PUSCH repetition to be multiplexed with the A-CSI is to be multiplexed with uplink control information (UCI) not having A-CSI therein.

Aspect 11: The method of any one of Aspects 1-10, further comprising: determining an actual number of PUSCH repetitions eligible for multiplexing with the A-CSI to be the maximum number of PUSCH repetitions that are scheduled the earliest among a total number of scheduled PUSCH repetitions when the maximum number is lesser than the total number.

Aspect 12: The method of Aspect 11, further comprising: removing, from the actual number of PUSCH repetitions eligible for multiplexing the A-CSI, one or more PUSCH repetitions that carry an uplink control information (UCI) not having A-CSI therein.

Aspect 13: The method of Aspect 12, wherein the UCI comprises one or more of: a hybrid automatic repeat request (HARD) acknowledgement (ACK) feedback, a scheduling request (SR), a periodic or semi-periodic CSI associated with a physical uplink control channel (PUCCH) that overlaps with a PUSCH, or at least one type of UCI that has higher priority than the A-CSI.

Aspect 14: The method of Aspect 12, further comprising: removing, from the actual number of PUSCH repetitions not carrying UCI, one or more PUSCH repetitions that have different lengths; when the removal yields a remaining number of the actual number of PUSCH repetitions that exceeds one, multiplexing the A-CSI with PUSCH repetitions indicated by the remaining number; and when the removal yields a remaining number of the actual number of PUSCH repetitions equals to one, multiplexing the A-CSI with a first scheduled PUSCH repetition.

Aspect 15: A method for wireless communications at a network entity, comprising: outputting, for transmission to a user equipment (UE), signaling indicating that the UE is to multiplex aperiodic channel state information (A-CSI) with at least two physical uplink shared channel (PUSCH) repetitions when one or more conditions are met; outputting, for transmission to the UE, signaling scheduling the UE to transmit the at least two PUSCH repetitions, wherein the at least two PUSCH repetitions are associated with a first sounding reference signal (SRS) resource set; and obtaining the at least two PUSCH repetitions with the A-CSI multiplexed based on the signaling indication and the one or more conditions.

Aspect 16: The method of Aspect 15, wherein the signaling indicating that the UE is to multiplex A-CSI with the at least two PUSCH repetitions comprises radio resource control (RRC) signaling that configures the UE per bandwidth part (BWP) or component carrier (CC).

Aspect 17: The method of any one of Aspects 15-16, wherein the signaling scheduling the UE to transmit the at least two PUSCHs with repetitions comprises downlink control information (DCI), the DCI indicating an aperiodic trigger state; and wherein the signaling indicating that the UE is to multiplex A-CSI with the at least two PUSCHs with repetitions comprises radio resource control (RRC) signaling that configures the aperiodic trigger state.

Aspect 18: The method of any one of Aspects 15-17, wherein the signaling indicating that the UE is to multiplex A-CSI with the at least two PUSCHs with repetitions comprises a dedicated field in downlink control information (DCI) unrelated to channel state information (CSI) request.

Aspect 19: The method of any one of Aspects 15-18, further comprising: outputting, for transmission to the UE, a maximum number of PUSCH repetitions eligible for multiplexing with the A-CSI.

Aspect 20: The method of Aspect 19, wherein the maximum number comprises a default value equivalent to a total number of scheduled PUSCH repetitions when the maximum number is not explicitly indicated or when the maximum number exceeds the total number of scheduled PUSCH repetitions.

Aspect 21: The method of any one of Aspects 15-20, further comprising: outputting, for transmission to the UE, signaling scheduling the UE to transmit another set of PUSCH repetitions associated with a second SRS resource set.

Aspect 22: The method of Aspect 21, wherein: the signaling indicating that the UE is to multiplex the A-CSI to PUSCH repetitions associated with the first SRS resource set indicates that the UE is to multiplex the A-CSI to PUSCH repetitions associated with the first set of SRS resource set, the second SRS resource set, or both the first and second SRS resource sets.

Aspect 23: The method of Aspect 22, further comprising: outputting, for transmission to the UE, a respective maximum number of PUSCH repetitions associated with the first and second SRS sets eligible for multiplexing with the A-CSI.

Aspect 24: The method of any one of Aspects 15-23, wherein the one or more conditions comprise at least one of: two or more sets of PUSCH repetitions to be multiplexed with the A-CSI share a common length; or no PUSCH repetition to be multiplexed with the A-CSI is to be multiplexed with uplink control information (UCI) not having A-CSI therein.

Aspect 25: The method of any one of Aspects 15-24, further comprising: determining an actual number of PUSCH repetitions eligible for multiplexing with the A-CSI to be the maximum number of PUSCH repetitions that are scheduled the earliest among a total number of scheduled PUSCH repetitions when the maximum number is lesser than the total number.

Aspect 26: The method of Aspect 25, further comprising: removing, from the actual number of PUSCH repetitions eligible for multiplexing the A-CSI, one or more PUSCH repetitions that carry an uplink control information (UCI) not having A-CSI therein.

Aspect 27: The method of Aspect 26, wherein the UCI comprises one or more of: a hybrid automatic repeat request (HARQ) acknowledgement (ACK) feedback, a scheduling request (SR), a periodic or semi-periodic CSI associated with a physical uplink control channel (PUCCH) that overlaps with a PUSCH, or at least one type of UCI that has higher priority than the A-CSI.

Aspect 28: The method of Aspect 26, further comprising: removing, from the actual number of PUSCH repetitions not carrying UCI, one or more PUSCH repetitions that have different lengths; when the removal yields a remaining number of the actual number of PUSCH repetitions that exceeds one, demultiplexing the A-CSI from PUSCH repetitions indicated by the remaining number; and when the removal yields a remaining number of the actual number of PUSCH repetitions equals to one, demultiplexing the A-CSI from a first scheduled PUSCH repetition.

Aspect 29: An apparatus for wireless communications, comprising: a memory comprising instructions; and one or more processors configured to execute the instructions and cause the apparatus to perform a method in accordance with any one of Aspects 1-14.

Aspect 30: An apparatus for wireless communications, comprising: a memory comprising instructions; and one or more processors configured to execute the instructions and cause the apparatus to perform a method in accordance with any one of Aspects 15-28.

Aspect 31: A user equipment (UE), comprising: at least one transceiver; a memory comprising instructions; and one or more processors configured to execute the instructions and cause the UE to perform a method in accordance with any one of Aspects 1-14, wherein the at least one transceiver is configured to receive the signaling indicating that the UE is to multiplex A-CSI with the at least two PUSCH repetitions when one or more conditions are met, receive signaling scheduling the UE to transmit the at least two PUSCH repetitions, or transmit the at least two PUSCH repetitions for multiplexing with the A-CSI.

Aspect 32: A network entity, comprising: at least one transceiver; a memory comprising instructions; and one or more processors configured to execute the instructions and cause the network entity to perform a method in accordance with any one of Aspects 15-28, wherein the at least one transceiver is configured to transmit the signaling indicating that the UE is to multiplex A-CSI with the at least two PUSCH repetitions when one or more conditions are met, transmit the signaling scheduling the UE to transmit the at least two PUSCH repetitions, or transmit the at least two PUSCH repetitions with the A-CSI multiplexed.

Aspect 33: An apparatus for wireless communications, comprising means for performing a method in accordance with any one of Aspects 1-14.

Aspect 34: An apparatus for wireless communications, comprising means for performing a method in accordance with any one of Aspects 15-28.

Aspect 35: A non-transitory computer-readable medium comprising instructions that, when executed by an apparatus, cause the apparatus to perform a method in accordance with any one of Aspects 1-14.

Aspect 36: A non-transitory computer-readable medium comprising instructions that, when executed by an apparatus, cause the apparatus to perform a method in accordance with any one of Aspects 15-28.

The invention claimed is:

1. An apparatus for wireless communications, the apparatus comprising:
  one or more memories comprising instructions; and
  one or more processors configured to execute the instructions and cause the apparatus to:
    receive signaling indicating that a user equipment (UE) is to multiplex aperiodic channel state information (A-CSI) with at least two physical uplink shared channel (PUSCH) repetitions when one or more conditions are met;
    receive signaling scheduling the UE to transmit the at least two PUSCH repetitions, wherein the at least two PUSCH repetitions are associated with a same first sounding reference signal (SRS) resource set; and
    transmit the at least two PUSCH repetitions for multiplexing with the A-CSI based on the signaling indication and the one or more conditions.

2. The apparatus of claim 1, wherein the signaling indicating that the UE is to multiplex the A-CSI with the at least two PUSCH repetitions comprises radio resource control (RRC) signaling that configures the UE per bandwidth part (BWP) or component carrier (CC).

3. The apparatus of claim 1, wherein:
  the signaling scheduling the UE to transmit the at least two PUSCH repetitions comprises downlink control information (DCI), the DCI indicating an aperiodic trigger state; and
  the signaling indicating that the UE is to multiplex the A-CSI with the at least two PUSCH repetitions comprises radio resource control (RRC) signaling that configures the aperiodic trigger state.

4. The apparatus of claim 1, wherein the signaling indicating that the UE is to multiplex the A-CSI with the at least two PUSCH repetitions comprises a dedicated field in downlink control information (DCI) unrelated to channel state information (CSI) request.

5. The apparatus of claim 1, further comprising:
receive a maximum number of PUSCH repetitions eligible for multiplexing with the A-CSI.

6. The apparatus of claim 5, wherein the maximum number comprises a default value equivalent to a total number of scheduled PUSCH repetitions when the maximum number is not explicitly indicated or when the maximum number exceeds the total number of scheduled PUSCH repetitions.

7. The apparatus of claim 1, wherein the one or more processors are further configured to execute the instructions and cause the apparatus to:
receive signaling scheduling the UE to transmit another set of PUSCH repetitions associated with a second SRS resource set.

8. The apparatus of claim 7, wherein:
the signaling indicating that the UE is to multiplex the A-CSI to PUSCH repetitions associated with the same first SRS resource set indicates that the UE is to multiplex the A-CSI to PUSCH repetitions associated with the same first SRS resource set, the second SRS resource set, or both the same first SRS resource set and the second SRS resource set.

9. The apparatus of claim 8, wherein the one or more processors are further configured to execute the instructions and cause the apparatus to:
receive a respective maximum number of PUSCH repetitions associated with the same first SRS resource set and the second SRS resource set eligible for multiplexing with the A-CSI.

10. The apparatus of claim 1, wherein the one or more conditions comprise at least one of:
two or more sets of PUSCH repetitions to be multiplexed with the A-CSI share a common length; or
no PUSCH repetition to be multiplexed with the A-CSI is to be multiplexed with uplink control information (UCI) not having A-CSI therein.

11. The apparatus of claim 1, wherein:
an actual number of PUSCH repetitions eligible for multiplexing with the A-CSI is a maximum number of PUSCH repetitions that are scheduled earliest among a total number of scheduled PUSCH repetitions when the maximum number of PUSCH repetitions is less than the total number.

12. The apparatus of claim 11, wherein the one or more processors are further configured to execute the instructions and cause the apparatus to:
remove, from the actual number of PUSCH repetitions eligible for multiplexing the A-CSI, one or more PUSCH repetitions that carry an uplink control information (UCI) not having A-CSI therein.

13. The apparatus of claim 12, wherein the UCI comprises one or more of:
a hybrid automatic repeat request (HARQ) acknowledgement (ACK) feedback,
a scheduling request (SR),
a periodic or semi-periodic CSI associated with a physical uplink control channel (PUCCH) that overlaps with a PUSCH, or at least one type of UCI that has higher priority than the A-CSI.

14. The apparatus of claim 12, wherein the one or more processors are further configured to execute the instructions and cause the apparatus to:
remove, from the actual number of PUSCH repetitions not carrying UCI, the one or more PUSCH repetitions that have different lengths;
when, after the removal, a remaining number of the actual number of PUSCH repetitions that exceeds one, multiplex the A-CSI with PUSCH repetitions indicated by the remaining number; and
when, after the removal, the remaining number of the actual number of PUSCH repetitions equals to one, multiplex the A-CSI with a first scheduled PUSCH repetition.

15. An apparatus for wireless communications, the apparatus comprising:
one or more memories comprising instructions; and
one or more processors configured to execute the instructions and cause the apparatus to:
transmit signaling indicating that the UE is to multiplex aperiodic channel state information (A-CSI) with at least two physical uplink shared channel (PUSCH) repetitions when one or more conditions are met;
transmit signaling scheduling the UE to transmit the at least two PUSCH repetitions, wherein the at least two PUSCH repetitions are associated with a same first sounding reference signal (SRS) resource set; and
receive the at least two PUSCH repetitions with the A-CSI multiplexed based on the signaling indication and the one or more conditions.

16. The apparatus of claim 15, wherein the signaling indicating that the UE is to multiplex the A-CSI with the at least two PUSCH repetitions comprises radio resource control (RRC) signaling that configures the UE per bandwidth part (BWP) or component carrier (CC).

17. The apparatus of claim 15, wherein:
the signaling scheduling the UE to transmit the at least two PUSCH repetitions comprises downlink control information (DCI), the DCI indicating an aperiodic trigger state; and
the signaling indicating that the UE is to multiplex the A-CSI with the at least two PUSCH repetitions comprises radio resource control (RRC) signaling that configures the aperiodic trigger state.

18. The apparatus of claim 15, wherein the signaling indicating that the UE is to multiplex the A-CSI with the at least two PUSCH repetitions comprises a dedicated field in downlink control information (DCI) unrelated to channel state information (CSI) request.

19. The apparatus of claim 15, wherein the one or more processors are further configured to execute the instructions and cause the apparatus to:
transmit a maximum number of PUSCH repetitions eligible for multiplexing with the A-CSI.

20. The apparatus of claim 19, wherein the maximum number comprises a default value equivalent to a total number of scheduled PUSCH repetitions when the maximum number is not explicitly indicated or when the maximum number exceeds the total number of scheduled PUSCH repetitions.

21. The apparatus of claim 15, wherein the one or more processors are further configured to execute the instructions and cause the apparatus to:

transmit signaling scheduling the UE to transmit another set of PUSCH repetitions associated with a second SRS resource set.

22. The apparatus of claim 21, wherein:

the signaling indicating that the UE is to multiplex the A-CSI to PUSCH repetitions associated with the same first SRS resource set indicates that the UE is to multiplex the A-CSI to PUSCH repetitions associated with the same first SRS resource set, the second SRS resource set, or both the same first SRS resource set and the second SRS resource set.

23. The apparatus of claim 22, wherein the one or more processors are further configured to execute the instructions and cause the apparatus to:

transmit a respective maximum number of PUSCH repetitions associated with the same first SRS resource set and the second SRS resource set eligible for multiplexing with the A-CSI.

24. The apparatus of claim 15, wherein the one or more conditions comprise at least one of:

two or more sets of PUSCH repetitions to be multiplexed with the A-CSI share a common length; or no PUSCH repetition to be multiplexed with the A-CSI is to be multiplexed with uplink control information (UCI) not having A-CSI therein.

25. The apparatus of claim 15, wherein:

an actual number of PUSCH repetitions eligible for multiplexing with the A-CSI is a maximum number of PUSCH repetitions that are scheduled earliest among a total number of scheduled PUSCH repetitions when the maximum number of PUSCH repetitions is less than the total number.

26. The apparatus of claim 25, wherein the one or more processors are further configured to execute the instructions and cause the apparatus to:

remove, from the actual number of PUSCH repetitions eligible for multiplexing the A-CSI, one or more PUSCH repetitions that carry an uplink control information (UCI) not having A-CSI therein.

27. The apparatus of claim 26, wherein the UCI comprises one or more of:

a hybrid automatic repeat request (HARQ) acknowledgement (ACK) feedback, a scheduling request (SR), a periodic or semi-periodic CSI associated with a physical uplink control channel (PUCCH) that overlaps with a PUSCH, or at least one type of UCI that has higher priority than the A-CSI.

28. The apparatus of claim 26, wherein the one or more processors are further configured to execute the instructions and cause the apparatus to:

remove, from the actual number of PUSCH repetitions not carrying UCI, the one or more PUSCH repetitions that have different lengths;

when, after the removal, a remaining number of the actual number of PUSCH repetitions that exceeds one, demultiplex the A-CSI from PUSCH repetitions indicated by the remaining number; and when, after the removal, the remaining number of the actual number of PUSCH repetitions equals to one, demultiplex the A-CSI from a first scheduled PUSCH repetition.

29. The apparatus of claim 15, further comprising at least one transceiver configured to:

transmit the signaling indicating that the UE is to multiplex the A-CSI with the at least two PUSCH repetitions when the one or more conditions are met;

transmit the signaling scheduling the UE to transmit the at least two PUSCH repetitions; or receive the at least two PUSCH repetitions with the A-CSI multiplexed, wherein the apparatus is configured as a network entity.

30. A user equipment (UE), comprising:

at least one transceiver;

one or more memories comprising instructions; and one or more processors configured to execute the instructions and cause the UE to:

receive, via the at least one transceiver, first signaling indicating that the UE is to multiplex aperiodic channel state information (A-CSI) with at least two physical uplink shared channel (PUSCH) repetitions when one or more conditions are met;

receive, via the at least one transceiver, second signaling scheduling the UE to transmit the at least two PUSCH repetitions, wherein the at least two PUSCH repetitions are associated with a same first sounding reference signal (SRS) resource set; and transmit, via the at least one transceiver, the at least two PUSCH repetitions for multiplexing with the A-CSI based on the signaling indication and the one or more conditions.

* * * * *